(12) United States Patent
Williams, II et al.

(10) Patent No.: US 10,083,490 B2
(45) Date of Patent: Sep. 25, 2018

(54) METHOD AND SYSTEM FOR IMPLEMENTING A CUSTOM WORKSPACE FOR A SOCIAL RELATIONSHIP MANAGEMENT SYSTEM

(71) Applicant: ORACLE INTERNATIONAL CORPORATION, Redwood Shores, CA (US)

(72) Inventors: Horace Williams, II, Atlanta, GA (US); John Benjamin Nolt, Atlanta, GA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 378 days.

(21) Appl. No.: 14/828,466

(22) Filed: Aug. 17, 2015

(65) Prior Publication Data

US 2016/0048317 A1    Feb. 18, 2016

Related U.S. Application Data

(60) Provisional application No. 62/038,831, filed on Aug. 18, 2014, provisional application No. 62/055,926, filed on Sep. 26, 2014.

(51) Int. Cl.
*G06F 3/0484* (2013.01)
*G06Q 50/00* (2012.01)
*G06Q 30/02* (2012.01)

(52) U.S. Cl.
CPC ......... *G06Q 50/01* (2013.01); *G06Q 30/0277* (2013.01)

(58) Field of Classification Search
CPC ............ G06F 3/04847; G06F 3/04842; G06Q 30/0277; G06Q 50/01
See application file for complete search history.

(56) References Cited

U.S. PATENT DOCUMENTS

| | | | |
|---|---|---|---|
| 8,799,756 B2 * | 8/2014 | Grosz | G06F 3/1242 382/118 |
| 9,122,758 B1 * | 9/2015 | Blower | G06F 17/30867 |
| 9,164,990 B2 | 10/2015 | Vainer et al. | |
| 9,218,189 B2 | 12/2015 | Vainer et al. | |
| 9,633,399 B2 | 4/2017 | George et al. | |
| 2009/0172081 A1 * | 7/2009 | Bryant | G06Q 10/10 709/203 |
| 2010/0228617 A1 * | 9/2010 | Ransom | G06Q 30/02 705/14.25 |
| 2011/0145279 A1 * | 6/2011 | Chunilal | G06F 17/30867 707/769 |
| 2011/0258561 A1 * | 10/2011 | Ladouceur | G06Q 10/103 715/753 |

(Continued)

*Primary Examiner* — Anil K Bhargava
(74) *Attorney, Agent, or Firm* — Invoke

(57) ABSTRACT

Disclosed is a system, method, and computer program product for implementing a marketing automation tool that provides an improved approach for an integrated and/or customized workspace for a social relationship management system. The present invention provides a mechanism to allow the user of a SRM system to configure a workspace for the SRM product, to choose the specific functionality from the SRM suite to be displayed and executed for the user and to post a message while simultaneously viewing the workspace.

20 Claims, 20 Drawing Sheets

(56) References Cited

U.S. PATENT DOCUMENTS

| | | | |
|---|---|---|---|
| 2012/0036423 A1* | 2/2012 | Haynes, II | G06Q 30/0201 715/230 |
| 2012/0078870 A1* | 3/2012 | Bazaz | G06F 17/30247 707/706 |
| 2013/0030909 A1* | 1/2013 | Shih | G06Q 30/0277 705/14.48 |
| 2013/0046839 A1* | 2/2013 | Ransom | G06Q 30/02 709/206 |
| 2013/0086483 A1* | 4/2013 | Vainer | G06F 9/452 715/751 |
| 2013/0159926 A1* | 6/2013 | Vainer | G06F 17/30 715/804 |
| 2013/0304828 A1* | 11/2013 | Robertson | H04L 65/403 709/206 |
| 2014/0082525 A1* | 3/2014 | Kass | H04L 65/403 715/753 |
| 2014/0164087 A1* | 6/2014 | Sun | G06Q 30/0224 705/14.25 |
| 2014/0180788 A1 | 6/2014 | George et al. | |
| 2015/0081429 A1 | 3/2015 | Strutton et al. | |
| 2015/0127628 A1* | 5/2015 | Rathod | H04W 4/21 707/710 |
| 2015/0281250 A1* | 10/2015 | Miller | H04L 63/105 726/1 |

\* cited by examiner

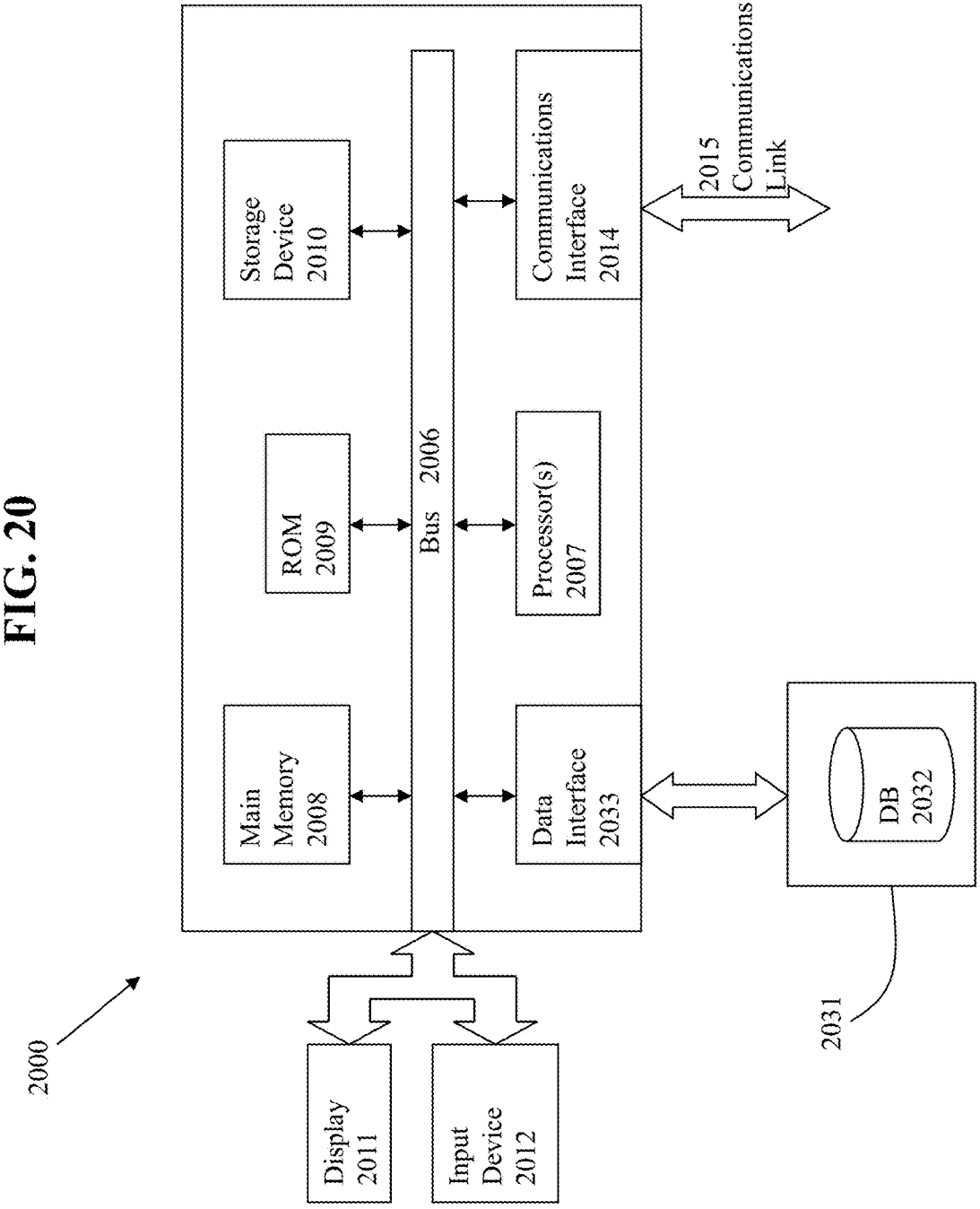

METHOD AND SYSTEM FOR IMPLEMENTING A CUSTOM WORKSPACE FOR A SOCIAL RELATIONSHIP MANAGEMENT SYSTEM

CROSS-REFERENCE TO RELATED APPLICATION(S)

This application claims priority to U.S. Provisional Patent Application Ser. No. 62/038,831 filed on Aug. 18, 2014 entitled "METHOD AND SYSTEM FOR IMPLEMENTING A CUSTOM WORKSPACE FOR A SOCIAL RELATIONSHIP MANAGEMENT SYSTEM," and U.S. Provisional Patent Application Ser. No. 62/055,926 filed on Sep. 26, 2014 entitled "METHOD AND SYSTEM FOR IMPLEMENTING A POSTING OBJECT WITHIN A CUSTOM WORKSPACE FOR A SOCIAL RELATIONSHIP MANAGEMENT SYSTEM," .The content of the aforementioned patent applications is hereby expressly incorporated by reference in its entirety.

BACKGROUND

Given the widespread availability and usage of the internet by consumers and society at large, many organizations have become interested in being able to effectively implement solutions that can target users over the internet. To accomplish this, many organizations (e.g., businesses, non-profits, government agencies, etc.) are now using marketing automation tools to target prospects, obtain intelligence regarding sentiments and social themes/topics, execute marketing campaigns, send leads to sales in real time, convert marketing leads into actual sales, and perform analytics over the social/marketing data. An example of a commercially available marketing automation product is the Social Relationship Management product, available from Oracle Corporation of Redwood Shores, Calif.

In many cases, a suite of multiple products is used to provide the functionality expected by the customer of the social relationship management (SRM) system. Each of the products in the suite may have different levels of capabilities and functionality that would be useful for the user of the SRM system. For example, a first product in the suite may be particularly useful to perform marketing automation functions, while a second product in the suite may be useful to perform analysis of social data for sentiment, theme identification, etc.

One problem that may exist is that there might be inconsistent levels of integration in the suite for the multiple products, which may result in certain inconveniences and inefficiencies for the user of the suite. For example, if an insufficient level of integration exists for the user interface, the user may be forced to navigate between different product user interfaces for the multiple products in order to access the set of functionality provided by the different products.

Therefore, there is a need for an improved approach to help users visualize data from multiple products in an integrated platform.

SUMMARY

One or more embodiments of the current application address the above problems by providing a workspace to manage communications over a plurality of SRM applications. In one aspect, a system comprises a first social relationship management (SRM) application that manages a first social media data for a plurality of social media networks, a second SRM application that manages a second social media data for the plurality of social media networks, an editing interface for configuring a workspace to manage communications over the first and second SRM applications, wherein the editing interface comprises control elements to select a set of configuration parameters for the workspace, at least a portion of the set of configuration parameters corresponding to defining the first social media data associated with the first SRM application, and the second social media data associated with the second SRM application, a configuration database having a tangible storage medium for storing the set of configuration parameters that are selected using the editing interface, a first connector coupled to a database associated with the first SRM application to transmit the first social media data selected through the editing interface, a second connector coupled to a database associated with the second SRM application to transmit the second social media data selected through the editing interface, and an execution engine having a processor communicatively coupled to the configuration database and the first and second connectors for retrieving the set of configuration parameters from the configuration database, and populating, based at least in part on the selected set of configuration parameters, a first portion of the workspace with the first social media data, and a second portion of the workspace with the second social media data.

Further details of aspects, objects, and advantages of embodiments are described below in the detailed description, drawings, and claims. Both the foregoing general description and the following detailed description are examples only and explanatory, and are not intended to be limiting as to the scope of the disclosure.

BRIEF DESCRIPTION OF FIGURES

FIG. 20 shows an architecture of an example computing system with which the invention may be implemented.

DETAILED DESCRIPTION

Figure 1:
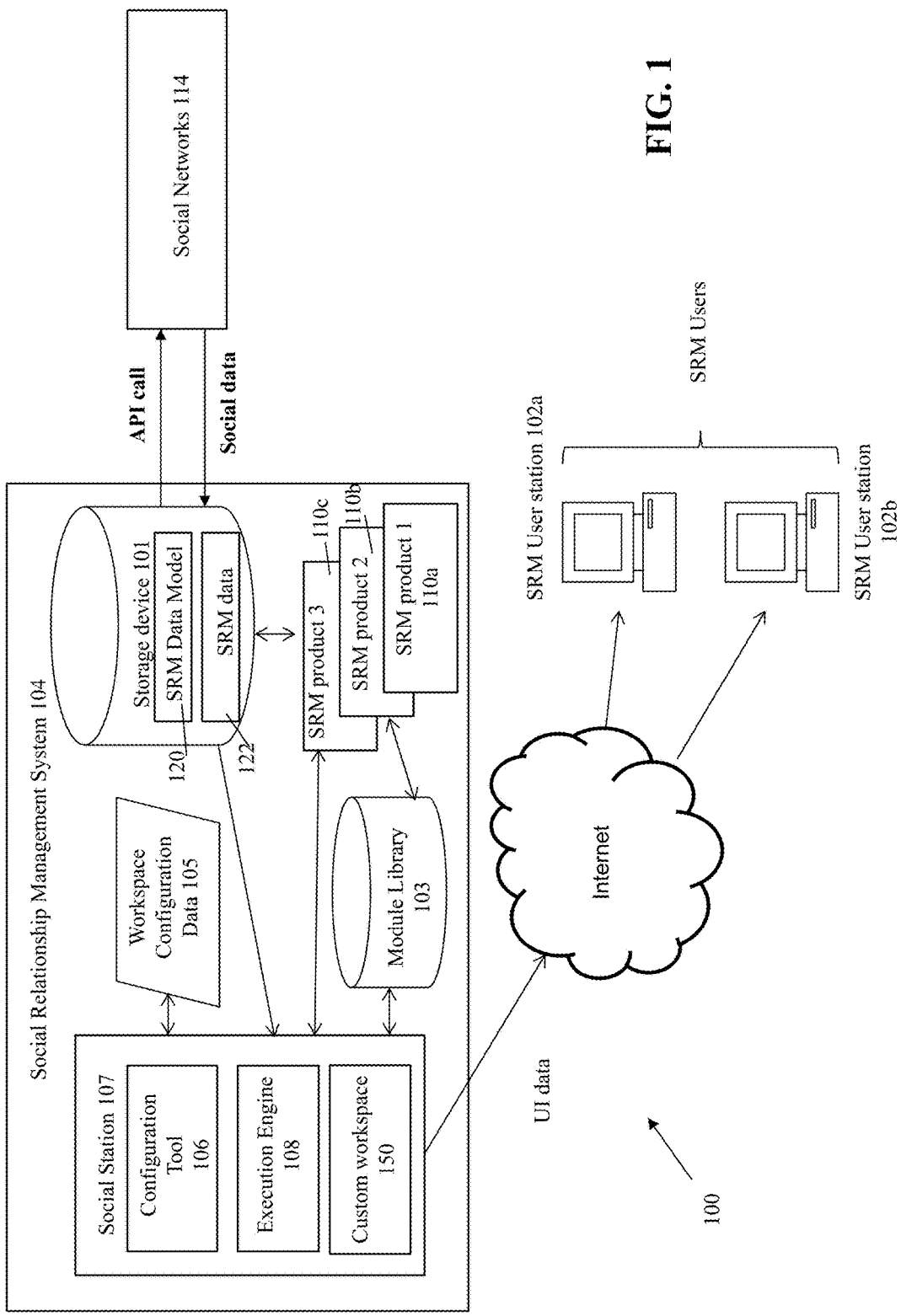
FIG. 1 illustrates an example system which may be employed in some embodiments of the invention.

Embodiments of the present disclosure provide a system, method, and computer program product for creating a custom workspace that integrates elements from a plurality of social relationship management (SRM) tools or applications, thus allowing organizations to effectively visualize a plurality of data types, and leverage social media data from different SRM applications on a single workspace to meaningfully interact with different data types and craft communications based at least in part on various social media data associated with the various SRM applications. A customizable workspace is provided that allows users of the SRM system to populate the workspace with desired modules from a plurality of SRM applications. The workspace may further comprise a "Quickpost" functionality that allows a user to post data directly to one or more social networks through the workspace itself. Further details on the various functionalities will be provided further below.

Overview

The popularity of social media websites or portals, such as Facebook®, Twitter®, and others has increased markedly in recent years, compelling marketers and advertisers to analyze the potential of these channels for marketing their products and services. These portals provide a platform for individual users to interact, and at the same time present organizations with potential marketing tools, such as Facebook® pages, or Twitter® handles, enabling marketers to interact with social media "followers." Marketers can post messages or advertisements on these social media systems as a way to advertise outside traditional marketing channels. Members, in turn, can respond by clicking on embedded links, replying to the messages, starting posts based on the messages, or performing other site-specific functions. Further, marketers can embed an organization-specific or marketing campaign-specific URL (webpage address) within the messages, driving users and web traffic to a separate web site.

Even though viral marketing through these social media systems can prove profitable for organizations in terms of additional media coverage, and greater brand awareness, organizations may face difficulties in maintaining and managing content associated with more than one brand category on a given social media system on an ongoing basis. A "brand category" relates to a classification of content associated with a given marketer or organization. For example, a brand category for a given company could be retail or franchise locations associated with or operated by the company, product lines within the company, customer segments, trademarks, etc. Within each brand category are individual "brand items", such as individual retail locations, specific products within a product line, etc. (e.g., a Miami store location could be a "brand item" within the "retail locations" brand category). Further, the content associated with a given brand item on a social media system could be text posts, photos, videos, coupons, and other similar types of content related to the brand item and displayed on a social media system web page or account. Details associated with brand items and brand categories are described in greater detail below.

For marketers (e.g., companies, organizations, individuals, etc.), the task of updating and managing social media system pages or accounts associated with these brand categories, and the individual brand items within each category, with new advertising content on a regular basis can become overwhelming.

As noted above, many marketers are now using marketing automation tools to target prospects, obtain intelligence regarding sentiments and social themes/topics, execute marketing campaigns, send leads to sales in real time, convert marketing leads into actual sales, and perform analytics over the social/marketing data. The marketing automation tool can be configured to perform many types of marketing functions, such as targeting, engagement, conversion, and analytics.

The marketing automation tool can perform targeting, for example, by capturing data about prospects from online interactions and/or online behavior from website visits, downloads, social networks, and searches. This allows profiles to be constructed to more accurately provide content alignment in the marketing materials.

Engagement can be implemented, for example, by using the marketing automation system to efficiently create campaigns, mapping a prospect's online behavior to display ad versions to individually target and personalize to the recipient, and by curating content from the prospect's trusted networks, and to tie social activities to leads, pipeline, and even revenue.

Conversions can be facilitated by using the marketing automation system to implement better sales alignment, by aligning marketing and sales processes to boost revenue performance using profiles, content, and engagement. In addition, sales can be enabled by using pre-populated templates with consistent branded content that can be used to nurture and close deals.

The marketing automation tool can also be used to provide analytics for the marketing activities, e.g., by using dashboards and closed-loop reporting tools. Marketing ROI can be obtained, by measuring marketing return on investment and report on performance from major initiatives to individual campaigns. Benchmarking can also be performed, by measuring against other marketers.

In some cases, a suite of multiple SRM products is used to provide the various functionalities discussed above. Each of the products in the suite may have different types of functionalities for the user of the SRM system. For example, a first SRM application may be used for capturing data about various users. Another SRM application may be used to create marketing campaigns. Yet another SRM application may be used to analyze a degree of success of one or more marketing campaigns. In some cases, it may be difficult for the user to scroll back and forth through these various products in the SRM suite. Further details on example SRM products of a suite of SRM products will be provided further below.

Embodiments of the present disclosure provide a system, method, and computer program product for implementing a marketing automation tool that provides an improved approach to implement an integrated and/or customized workspace for users to interact with functionalities provided by a plurality of SRM products. In other words, a custom workspace is provided that allows users to interact with social media data associated with a plurality of SRM applications on the same interface. The present invention provides a mechanism to allow the user of a SRM system to configure a workspace on which to visualize and communicate with one or more desired functionalities of the SRM suite.

Before delving into details pertaining to the custom workspace, the various SRM applications that may be part of an SRM suite will be briefly described. It should be appreciated that the SRM products described herein are provided for illustrative purposes only, and other applications related to social media data may be similarly part of the SRM suite. The SRM suite may comprise a plurality of SRM applications and/or services that may be used for managing social relationships. For example, the SRM suite may comprise a social marketing SRM application, a publishing SRM application, an analytics SRM application, a data collection SRM application, and other applications related to management of social media data.

Clients of the integrated SRM platform may subscribe to any or all of the various SRM applications, and may advantageously use these various SRM products in conjunction with each other. This provides the client entity with a powerful suite of SRM products that allows the client entity to be cognizant of the various social media conversations around their product or brand, analyze these conversations, and publish content (e.g., promotional material, marketing content, etc.) to various social media channels accordingly. Many other functionalities may be similarly envisioned.

In one or more embodiments, an SRM application that is part of the SRM suite may be an application that monitors, and collects social media data from a plurality of social media networks. The SRM application allows an entity (e.g., a business, organization, non-profit, etc.) to access and integrate with various types of social media data. Data across multiple types of internet-based sources of social data and commentary may be accessed and collected. As discussed above, social media data may refer to multiple types of internet-based sources of social data that may be collected and analyzed.

The results of the analysis may be used to take action to construct and implement a social media marketing campaign. In some embodiments, the integrated system may be cloud-based, and may include both a social monitor/analysis service in addition to a social marketing or CRM application. Further details on how to implement such an SRM application are disclosed in U.S. patent application Ser. No. 14/040,565, entitled "METHOD AND SYSTEM FOR IMPLEMENTING A CLOUD-BASED SOCIAL MEDIA MARKETING METHOD AND SYSTEM," which is herein incorporated by reference in its entirety for all purposes.

This SRM application may be configured to monitor social media conversations based on one or more topics of interest to the entity. This SRM application may comprise a latent semantic analysis (LSA) functionality that performs semantic analysis on a large amount of data, and categorizes the data based on created topics. This functionality allows the client entity to sift through the deluge of social media communications based on topic, but also in a manner that is cognizant of the underlying semantic significance of the social media messages.

In some embodiments, the monitored social media data may be tagged and/or annotated. Tags may be associated with the analyzed content that pertain to actionable categorization of the social media data. This tagged data may be utilized by various entities to perform business processing. Further details on how to implement such an SRM application are disclosed in U.S. patent application Ser. No. 14/021,798, entitled "METHOD AND SYSTEM FOR IMPLEMENTING SEMANTIC ANALYSIS OF INTERNAL SOCIAL NETWORK CONTENT," which is herein incorporated by reference in its entirety for all purposes. Further details on how to implement another embodiment of the SRM application having some of the capabilities described above are also provided in U.S. patent application Ser. No. 14/021,820, entitled "METHOD AND SYSTEM FOR IMPLEMENTING A SOCIAL MEDIA MARKETING AND ENGAGEMENT APPLICATION," which is herein incorporated by reference in its entirety for all purposes. One example of a commercially available SRM application that may provide some of these capabilities includes the Listen and Analyze® SRM application that is available from Oracle Corporation of Redwood Shores, Calif.

Another SRM application of the SRM suite may be an analysis tool that is configured to provide analytics on data collected through the various social media networks (e.g., number of fans, type of media number of followers, user demographics, success of posts, etc.). This SRM application may allow users to view various analytics about social properties (e.g., social media network accounts, pages, etc.) associated with the customer entity. In one or more embodiments, the analytics SRM application may comprise a dashboard that allows users to view various metrics on data collected from various social media networks. For example, users may view data on fans of various social properties (e.g., a Facebook® page, etc.). Other analytics may relate to success of social marketing efforts (e.g., posts on social media networks, etc.) in one or more social media networks (e.g., how many "likes", "retweets," etc.). The analytics may be viewed for a particular date and/or time, in some embodiments. In other embodiments, the analytics may be viewed for a desired range of time. In one or more embodiments, the analytics application may be used to download analytic reports on one or more social properties. Or, the reports may simply be periodically emailed to users that request particular analytics reports.

In one or more embodiments, an example analysis SRM application may provide an evaluation process that comprises computation of meaningful qualitative and quantitative performance measures of various social media pages that will depend on engagements and interactions of users on a social media page. The evaluation process may include the ability to extract several analytics associated with different social media pages. Such analytics may comprise various page-specific criteria and parameters that characterize engagements and interactions of users on a social media page. Examples of such engagement criteria and parameters include number of posts by users in a social media page, number of comments made by users (to posts by other users) in a social media page, usage of multimedia tools (audio clips, video clips, polls etc.) in posts, and the like.

This information may be used to compute various statistics extracted from social media pages to arrive at a measure or value (e.g., a monetary value) that characterizes a brand's worth on a given social media page. Further details on how to implement such an SRM analysis application are provided in U.S. patent application Ser. No. 13/105,713, entitled "SYSTEMS AND METHODS FOR DETERMINING A VALUE OF SOCIAL MEDIA PAGES," which is herein incorporated by reference in its entirety for all purposes. One example of a commercially available SRM application that may provide some of these capabilities includes the Social marketing and Engagement® SRM application that is available from Oracle Corporation of Redwood Shores, Calif.

Yet another SRM application may allow users to publish social media communications on a plurality of social media platform, and more generally, manage these communications on an integrated publishing platform. In one or more embodiments, the publishing SRM application may be used to create and manage content on various social media networks to communicate with fans, followers and/or customers. Using the SRM application having publishing capabilities, users may reach out to members of the client entity's social media streams (e.g., Facebook® account, Twitter® account, etc.). The SRM application may allow users to create and schedule posts, review and analyze messages, and moderate and manage content on the various social media streams associated with the entity.

In one or more embodiments, the SRM application allows users to view all the posts created by the users (or other authorized users) for one or more social media streams. The posts may be published posts, scheduled posts or drafts created by the user(s). The user may also be able to view how well the posts are doing on the various social media streams. In one or more embodiments, the publishing SRM application may also allow users to view what users of the social media streams are saying in response to the published posts. Further, the publishing SRM application may allow users to create tags that provide visibility into how various marketing campaigns are faring in one or more social media networks.

In one or more embodiments, the publishing SRM application may provide a user interface that allows users to create customized social media messages pertaining to a product or brand that may be published (or scheduled to be published) on a plurality of social media networks using a single user interface. Further details on how to implement such a publishing SRM application are provided in U.S. patent application Ser. No. 13/004,790, entitled "CUSTOMIZABLE PUBLICATION VIA MULTIPLE OUTLETS," which is herein incorporated by reference in its entirety for all purposes.

In another embodiment, the SRM application having publishing capabilities may be a brand management system that allows marketers to maintain and integrate content across many brand categories in a social media system in a uniform fashion. Administrators or developers of individual marketing pages may update their pages through the brand management system using standard configurable templates. The system may integrate content from one or more developers to create content for varying pages (for example, by incorporating some global content into local pages according to configurable rules, or vice versa). Subsequently, when a social media system user requests content associated with a particular brand category or brand item within that category on a social media system, the brand management system renders the updated, requested marketing page associated with that category, but within a global marketer page, or with common marketer content also provided. Further details on how to implement such an SRM application are provided in U.S. patent application Ser. No. 12/880,882, entitled "SYSTEMS AND METHODS FOR MANAGING CONTENT ASSOCIATED WITH MULTIPLE BRAND CATEGORIES WITHIN A SOCIAL MEDIA SYSTEM," which is herein incorporated by reference in its entirety for all purposes.

In yet another example embodiment of an SRM application that has publishing capabilities, the SRM application may allow users to perform message personalization over multiple Internet messaging campaigns (e.g., to different target recipients) without having to perform large join operations for each campaign. Such technical solutions may serve to reduce use of computer memory, reduce demand for computer processing power, and/or reduce communication overhead needed.

Further details on how to implement such a publishing application are provided in U.S. patent application Ser. No. 14/798,354, entitled "MESSAGE PERSONALIZATION OVER MULTIPLE INTERNET MESSAGE CAMPAIGNS," which is herein incorporated by reference in its entirety for all purposes. One example of a commercially available SRM application that may provide some of these capabilities includes the Publish® SRM application that is available from Oracle Corporation of Redwood Shores, Calif.

Another SRM application may be a workflow automation SRM application that allows the client entity to manage various users for the client entity, manage one or more brand profiles, and also to manage various social properties associated with the client entity. In one or more embodiments, the SRM product may comprise a workflow and automation feature that allows users associated with an entity (e.g., business, organization, etc.) to control account settings, configure resources, topics, etc. These topics set by the organization may define a scope of categorized social media messages. The SRM product may accordingly categorize the messages based on the defined parameters set for one or more topics of interest. The workflow and automation feature allows the organization to manage various users associated with the entity, and to manage social properties relevant to the entity.

Social properties may refer to any social presence associated with the entity (e.g., a Facebook® page, a Twitter® page, a Google Plus® account, etc.). A profile page may be created with basic user information of the various users of the account. Various users may be grouped together into teams, and various users may be assigned to one or more social properties. Users may be members of the entity subscribing to the SRM services who are given access to the SRM account. It should be appreciated that various users may be given various permission levels and may be assigned to specific social properties and or teams associated with the SRM account. Teams may refer to groups of users who have access to the same social properties on the SRM account. In one or more embodiments, each team may be made up of sub-teams, which may be controlled by administrators the SRM account. New users may be added to the account, or information on existing users may be edited. Users may be grouped based on product, geography, designation, or any other criteria chosen by the entity.

Similarly, various workflow processes may be created and run while collaborating with users. Users associated with the entity may also define rules to automatically label, assign and/or delete posts to various social media networks. Similarly, the SRM application may allow users to add connections to other applications and/or Software-as-a-service (SaaS) services. In one or more embodiments, social properties may be grouped together into bundles. The bundles may be associated with users who all have access to the same bundle of social properties. Additionally, templates may be provided that allow users associated with the SRM account to publish a post to a specific country or language.

In one or more embodiments, an example SRM application having workflow automatic capabilities may enable marketers to select and sequence the delivery of marketing communications by taking into account specific user information and the flow of marketing messages from different systems that have already been delivered, or is scheduled to be delivered, to a specific user. Further details on how to implement such an SRM application are provided in U.S. patent application Ser. No. 13/421,364, entitled "SYSTEM AND METHOD FOR DELIVERING ONLINE ADVERTISEMENTS," which is herein incorporated by reference in its entirety for all purposes.

In another embodiment, the SRM application having workflow automation capabilities may allow marketing campaign designers to design multistage marketing programs using a drag-and-drop user interface and a library of pre-built program operation and steering components that are used to track and steer progress through the multistage marketing program. In some situations, marketers may like to control the prosecution of one or more marketing campaigns based on then-current real-time conditions (e.g., to take alternative prosecution paths based on then-current conditions). Further details on how to implement such a workflow automation application are provided in U.S. patent application Ser. No. 14/802,823, entitled "CONTROLLING REAL-TIME EXECUTION OF INTERNET COMMUNICATION CAMPAIGNS WITH PARAMETERIZABLE FLOW CONTROL STRUCTURES," which is herein incorporated by reference in its entirety for all purposes. One example of a commercially available SRM application that may provide some of these capabilities includes the Workflow and Automation® SRM application that is available from Oracle Corporation of Redwood Shores, Calif.

In yet another embodiment, one or more SRM applications may integrate one or more SRM capabilities described above. In some embodiments, this SRM product may comprise a data collection component that monitors conversations in various social media networks, and conveys the conversations back to the client entity such that it may be used to understand the customer's needs and/or to address the customer's concerns. Further, the SRM product may categorize social media conversations into various buckets to trigger various actions.

Consider, for illustrative purposes only, a marketer associated with a local bank, and how the SRM application(s) may be used to increase sales and/or revenue for the local bank. The SRM application may be used to gather various social media conversations about the local bank. The social media conversations may be positive communications regarding the local bank (or some branch of the bank, or any aspect of the bank) or negative communications regarding the local bank. The social media conversations may identify, for example, conversations associated with one or more customers that are satisfied or happy with the local bank, conversations associated with one or more customers that are dissatisfied or unhappy with the local bank. Further, the social media conversations may also be mined to identify conversations associated with customers that are happy or interested in a competitor bank, or conversations associated with customers that are dissatisfied with the competitor bank.

Based on this information (e.g., conversations pertaining to customers that are unhappy with a competitor), a new topic may be created to monitor other conversations that are similar in nature. The SRM platform may be constantly monitoring social media conversations, and categorizing the various social media conversations by created topics. This may provide the local bank with insights into what aspects of the competitor bank are disliked, and use this information to specifically market the local bank to those customers.

One particular customer of a competitor bank may have created a post on a social media network (e.g., Twitter®) expressing dissatisfaction on excessive fees charged by the competitor bank. Since the SRM product is monitoring such social media conversations, the SRM product may be used to specifically craft a message to the customer, acknowledging his post regarding the excessive fees charged by the competitor bank, and specifically outlining monetary advantages provided by the local bank that are superior to the competitor bank (e.g., no annual fees, sign-up discount, etc.).

In addition, the message may contain a link to a custom landing page for the customer. If the customer asks for more information, a lead may be generated with a marketing campaign that is assigned to a local sales rep of the local bank (e.g., using geo-location data derived from the social network). The sales representative of the local bank may access the generated lead on a user interface of SRM product, and may close the sale. Thus, the SRM product may be used to monitor social media conversations to convert a customer of a competitor to a customer of the local bank. Going further, the SRM product may be consistently used to ensure that customers of the local bank remain happy and satisfied with the local bank.

If the customer writes another post on another social media network expressing concern over banking services, the post may immediately be picked up by the SRM product and may be forwarded to a local service agent, who, in turn, may immediately follow up with the customer. Based on the post, a service issue entry may be created on the SRM application. In many situations it may simply be enough for the customer to feel "heard," and the issue may be successfully tagged as "resolved" on the SRM product simply based on the follow-up to the customer provided by the service agent. Thus, the monitored social media conversations may be advantageously used, and integrated with a SRM service application to anticipate issues and timely respond and/or tend to unhappy customers. This allows businesses to resolve issues at the very start of a problem, and allows the business to keep a pulse on the nature of communications surrounding the business.

In other words, the SRM application(s) distills the deluge of social interactions surrounding a business or organization into concrete actions that directly enhance the customer experience and/or increase sales. Therefore, businesses do not lose out on valuable communications surrounding the company or products just because the communications are not directly sent to them. Rather, general conversations and communications in various social media channels may be strategically mined to directly help the business or organization interact with it's customers and potential customers. In one or more embodiments, a single SRM application may span many functionalities (e.g., marketing, sales, service, commerce, etc.).

Given that a range of SRM applications may be provided as part of the SRM suite, an additional feature of the SRM platform may be a custom workspace or social station that allows users to benefit from functionalities provided by a plurality of SRM applications in the SRM suite. The Social Station may be thought of as an improved user interface that provides drag-and-drop capabilities allowing users to personalize a workspace with different SRM modules. This allows users to customize their view of social data of interest, and use this data in a single user interface in order to communicate to various social media streams. Thus a custom workspace provides a more personalized user experience allowing users to integrate functionalities from various SRM applications into the same user interface.

Social media data may refer to any data that is stored with respect to a desired functionality at a database associated with the SRM application. For example, the functionality may be sentiment analysis, and the SRM application may comprise one or more tables dedicated to sentiment analysis that was performed on a set of social media communications. Social media data may refer to the communications themselves, in one or more embodiments. In other embodiments, social media data associated with an SRM application may refer to a filtering function performed on data received from a plurality of social networks. For example, social media messages associated with numerous users may be filtered based on user age. Social media data may refer to data gathered about various social media users. Social media data may pertain to historical attributes of social media usage. It may also refer to more complex processing of social media communications (e.g., sentiment analysis, etc.). In other words, each of the SRM applications may be associated with some configured functionalities, and the social media data stored at the SRM application is data that is associated with the functionality.

An SRM application may be any SRM product that the client entity has subscribed to. For example, the SRM suite may comprise a host of SRM applications, each of which comprise one or more functionalities (e.g., analytics, publishing, etc.). Each SRM application may function independently from other SRM applications, and may be associated with dedicated database and other server infrastructure unique to the SRM application. In one or more embodiments, the various SRM applications may be associated with dedicated cloud infrastructure such that they function independently of one another. In other embodiments, some cloud infrastructure elements may be shared.

In one or more embodiments, each SRM application may have its respective set of client entities. In other words, a first SRM application may have a first set of client entities that subscribe to its services, and a second SRM application have a second set of client entities that subscribe to its services. In one or more embodiments, the various SRM applications follow a software-as-a-service (SaaS) model that allows various entities to subscribe to software services on a subscription or other type of payment scheme.

In other words, client entities may pick and choose one or more SRM applications based on the client entity's unique needs. Each SRM application may be associated with its unique authorization process and credentials. It should be appreciated that the term SRM application is used to describe whole SRM applications themselves, and not simply sub-components of one or more SRM applications. Examples of various sub-components may include user interfaces of the application, plug-ins of the applications, classes and/or data objects of the applications, control objects of the applications, databases of the applications etc.

An SRM application may be defined as one or more programs that are designed to perform one or more specific tasks for users. For example, an application may be an editing program. An application may be a graphics program, etc. In the context of SRM applications, a first SRM application may be configured to perform publishing tasks for end-users of the program. Another SRM application may be configured to perform analysis of social media data. Similarly, each of the SRM application may be configured for specific SRM-related capabilities that function independently from other SRM applications.

FIG. 1 illustrates an example system 100 which may be employed in some embodiments of the invention to implement an integrated marketing automation solution. The system 100 includes one or more users at one or more user stations 102 (e.g., 102*a* and 102*b*) that use the system 100 to operate and interact with the SRM system 104. The user station 102 comprises any type of computing station that may be used to operate or interface with the marketing automation applications in the system 100. Examples of such user stations include, for example, workstations, personal computers, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs.

The SRM system 104 comprises any communication and/or marketing related set of functionality that is accessible to users at the user stations 102, e.g., where the SRM system 104 may be implemented as a suite of multiple SRM products 1, 2, and 3 (e.g., 110*a*, 110*b* and 110*c*). The SRM system 104 may receive work requests from customers at the user stations 102. For example, the SRM system 104 may receive work request from a user to implement an email campaign using SRM product 1 (110*a*), perform analytics using SRM product 2 (110*b*), and perform sentiment analysis over social data using SRM product 3 (110*c*).

The work requests (e.g., to implement the email marketing campaigns or to perform analytics) may be implemented using customer/marketing data stored into a database in a computer readable storage device 101. This data 122 may include details and parameters for the marketing campaigns that have been established using the SRM system 104. The data may also include social data acquired from social networks 114 that have been retrieved using appropriate APIs, and which have been converted into data models 120 understandable and usable by the SRM system 104.

The computer readable storage device 101 comprises any combination of hardware and software that allows for ready access to the data that is located at the computer readable storage device. For example, the computer readable storage device 101 could be implemented as computer memory operatively managed by an operating system. The computer readable storage device 101 could also be implemented as an electronic database system having storage on persistent and/or non-persistent storage.

Within the social station 107, a configuration tool 106 is provided that permits the user to configure a custom workspace 150 for operating the SRM system 104. As used herein, the term "workspace" refers to the user work area that is provided to the user by the SRM system 104. More details on the custom workspace 150 will be provided further below.

A modular approach is provided to implement custom workspaces 150 in the SRM system 104, where a module library 103 is provided that includes a set of functionality modules selectable by the user to insert into a workspace. Each functionality module pertains to a discrete unit of functionality that is provided by the SRM system 104, and may implement functionality from any of the different SRM products 1, 2, or 3 (e.g., 110*a*, 110*b* and/or 110*c*). Advantageously, the customer workspace 150 may comprise any or all the functionalities selected by the user such that the user may visualize and interact with the desired functionalities in an integrated manner.

The configuration tool is therefore operable to configure a given workspace 150 in numerous ways. For example, the user can customize the workspace 150 by selecting one or more of the modules in the library to insert into a workspace. In addition, the parameters for the module are editable to customize the operation and display of the modules, e.g., to select data sources, display types, query dates, etc. Moreover, the workspace 150 itself is generally customizable, e.g., to configure the exact placement and organization of the modules on the workspace. The configuration settings for the workspace are stored into the configuration repository 105.

When the SRM system 104 is operated by the user at the user stations 102, the user is permitted to select the specific workspace to be provided to the user. An execution module 108 accesses the configuration data for that workspace, and will use that configuration data to generate the interface data to display to the user.

In this way, the user can create a customizable workspace 150 to interact with the SRM system 104. The customized workspace 150 may include modules to access functionality from multiple different SRM products. Therefore, by integrating the modules for different SRM products into the same workspace, this permits the user to operate the system in a cohesive way, even if the SRM system does not itself natively provide sufficient levels of integration in its UI for the multiple products.

Figure 2:
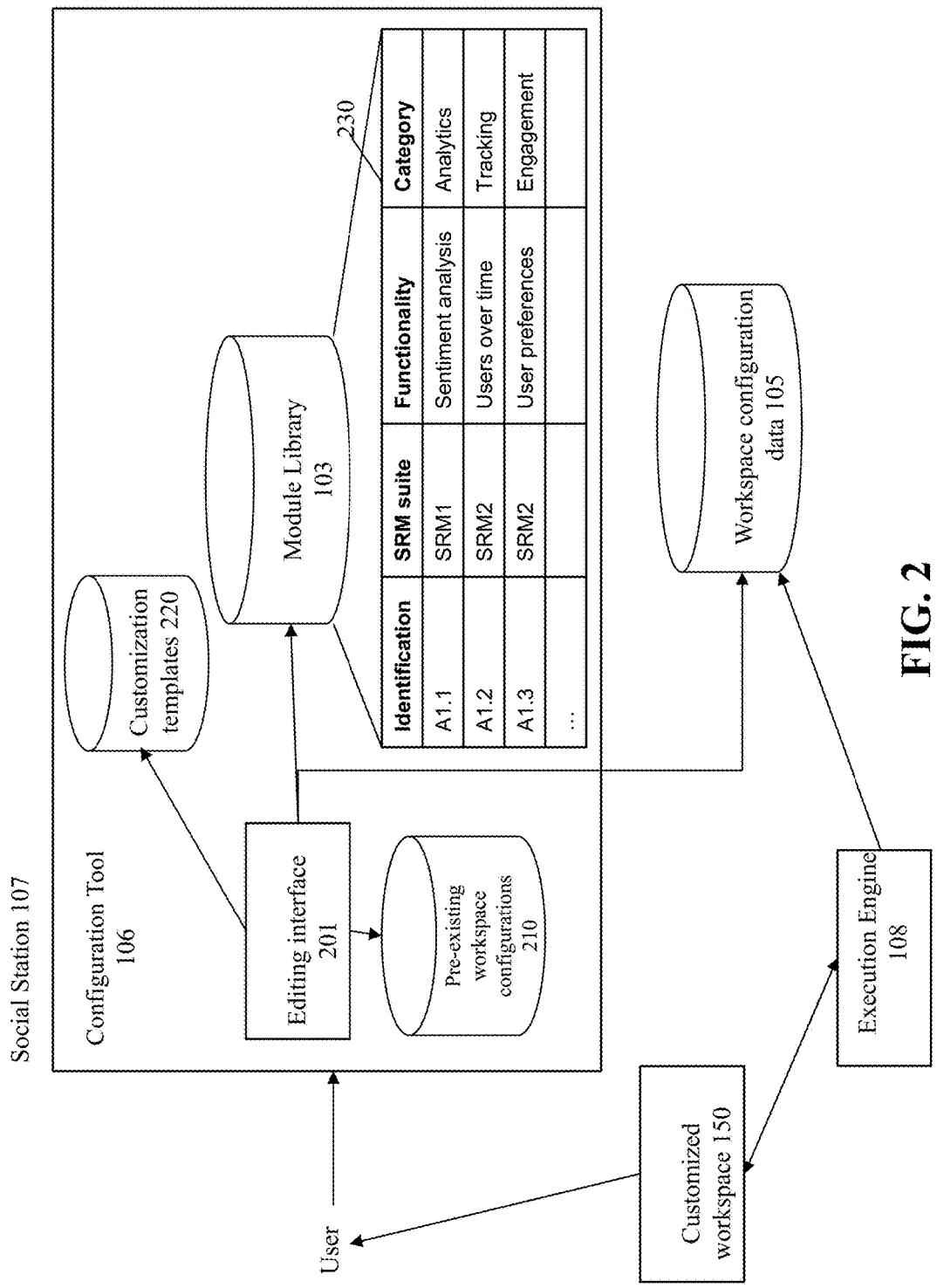
FIG. 2 illustrates an example embodiment of a configuration tool which may be employed in some embodiments of the invention.

FIG. 2 shows a detailed diagram of the configuration tool 106 that may be utilized by one or more users to configure the customizable workspace 150. As shown in FIG. 2, in one or more embodiments, an editing interface 201 may be provided that may be used by the user to interact with desired functionalities corresponding to a plurality of SRM products. The editing interface may comprise a set of control elements that allow a user to configure the workspace as desired. The control elements may be a "drag and drop" control element, allowing users to drag and drop a desired functionality into the workspace. The control elements may be a selection feature on the user interface. In other embodiments, a drop down menu may be generated to allow the user to select one or more functionalities or types of social media data.

In one or more embodiments, the editing interface 201 may allow a user to select one or more modules or functionalities that are of specific interest to the user. In other words, the editing interface 201 allows customization that is unique to each user. For example, the user may wish to see the analytics (e.g., provided by a first SRM product) side-by-side to a tracking of various users in various social media networks (e.g., provided by a second SRM product). Or, in another example, the user may wish to see four different analytics (e.g., for four different social networks) simultaneously on the same page. The editing interface 201 provides a customizable interface for any type of customization.

In one or more embodiments, the user may simply select from a list of pre-existing workspace configurations that are stored in a database 210. The pre-existing workspace configurations 210 may be previously configured by the user, and simply stored in the database 210. If a pre-existing workspace is desired, the editing interface 201 may simply retrieve the workspace associated with the user from the database 210. At this point, the user may edit the workspace if needed. Or, the user may add more modules to the workspace configuration in order to visualize more types of data.

In one or more embodiments, the editing interface 201 may communicate with a database of customization templates 220. The customization templates 220 may store configuration parameters for various predefined templates on which to view the desired modules. Each of the customization templates 220 may be thought of as a container on which data from various modules may simply be "drag and dropped". The customization templates 220 may store the predefined specifications for a designed template.

For example, a first customization template or container may be designed to house and visualize data from two modules. The size and specification of the predefined template may be stored in the customization template database 220. In another example, a second customization template may be designed to house and visualize four modules simultaneously. The size of the windows for the modules, the coordinates, etc., may be stored in the customization template database 220.

If the user would like to configure a workspace, a customization template 220 may be loaded based on the user's requirements (e.g., number of modules desired, design of template, size of windows, coordinates etc.), in one or more embodiments. In other embodiments, the system may automatically assign a template automatically without any user input.

Once the customization template 220 has been provided, the user may select desired modules to be populated in the workspace. A list of the various modules may be retrieved from the module library 103. In one or more embodiments, a list of the available functionalities may simply be displayed to the user, in response to determining that the user would like to populate the workspace. In other embodiments, the user may search for available modules with which to populate the workspace. For example, the user may simply enter in a search term with the name of the desired module.

A retrieval agent (not shown) may be configured to search the table 230 associated with the module library 103 to determine a match to the search input by the user. The table 230 may store an identification code unique to the module, the SRM product the functionality is associated with, a name of the functionality and/or a category associated with the functionality. Similarly, many other details may be stored in one or more tables associated with the module library 103.

Once the list has been populated, the user may simply drag and drop the module into a window of the customization template 220. For example, if the customization template has two windows, a first module from the list may be dragged and dropped into a first window, and a second module from the list may be dragged and dropped into the second window.

Various configuration parameters associated with the selected modules, and the selected customization template may be stored in the workspace configuration data 105 for quick retrieval when the user desires to view the workspace. The workspace configuration data 105 may comprise various configuration parameters associated with the custom designed workspace for a plurality of users. In one or more embodiments, each user may be associated with a plurality of workspaces. In other embodiments, an organization may have many workspaces stored in the workspace configuration data 105, and one or more users of the organization may have access to the workspace configuration data 105.

At the time of execution, the workspace configuration data may be accessed by the execution engine 108 in order to populate the workspace with data from the various selected modules. As discussed with respect to FIG. 1, based on the retrieved parameters of a workspace, the execution engine 108 may be configured to communicate directly with the plurality of SRM products (e.g., based on an identification retrieved from the workspace configuration data, etc.), and may retrieve the data directly from databases associated with the SRM product (not shown).

Thus, the execution engine 108 populates the customized workspace 150 having data from one or more desired modules, which may be visualized by the user through a user interface.

Figure 3:
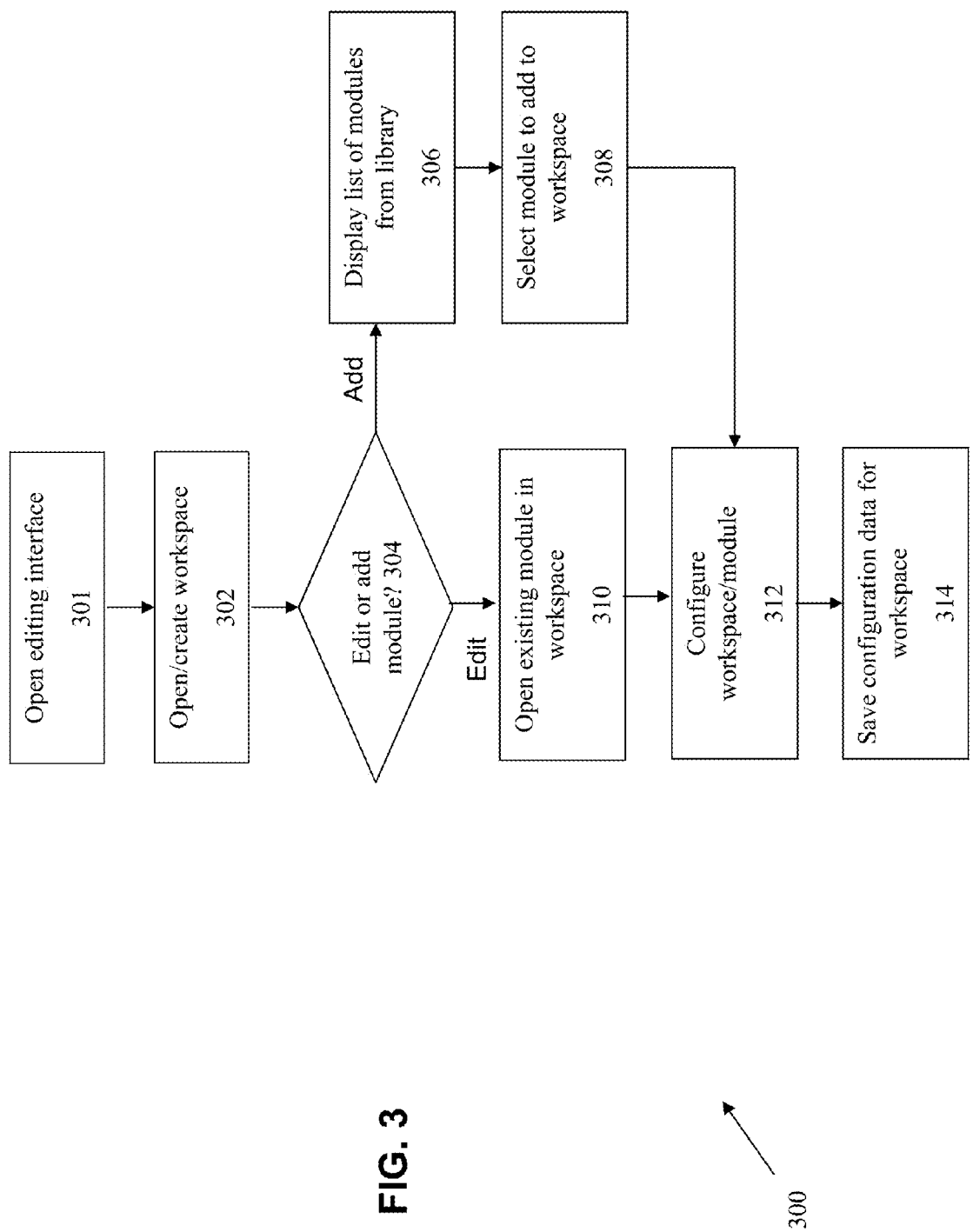
FIG. 3 shows a flowchart of a process for customizing a workspace according to some embodiments of the invention.

FIG. 3 shows a flowchart 300 of a process for customizing a workspace according to some embodiments of the invention. At 301, an editing interface is opened by the user for editing the workspace. In some embodiments, a drag-and-drop interface is provided, where a workspace palate (e.g., a customization template) is displayed in the interface for customizing the workspace. A list of available modules can be displayed, where any of the modules can be selected and then dropped onto the palate to include the selected module into the workspace.

At 302, a workspace is opened within the editing interface. The workspace may be an existing workspace that is to be edited, or may be a brand new workspace that is currently being created. Next, at 304, a determination is made whether the workspace is to be customized by adding a new module or by editing an existing module.

If the intent is to edit an existing module on the workspace, then that module is selected at 310. If the intent is to add a new module, then at 306, a list of available modules is displayed from the module library. At 308, one or more of the modules can be selected for addition to the workspace, e.g., by dragging and dropping the icon for the module onto the editing palate. In some embodiments, rather than just selecting a module from a list of available modules, the user may create a brand new module in the system. This option is intended for power users that may seek to custom create a new module, e.g., using an API exposed by the provider of the SRM system.

The workspace and/or the module can then be configured at 312. The configuration may be performed in numerous different ways. For example, the user can configure the module, e.g., to customize the operation and display of the modules to select data sources, display types, query dates, etc. In addition, the workspace can also customizable, e.g., to configure the exact placement and organization of the modules on the workspace. Thereafter, at 314, the configuration settings for the workspace are stored into the configuration repository.

Figure 4:
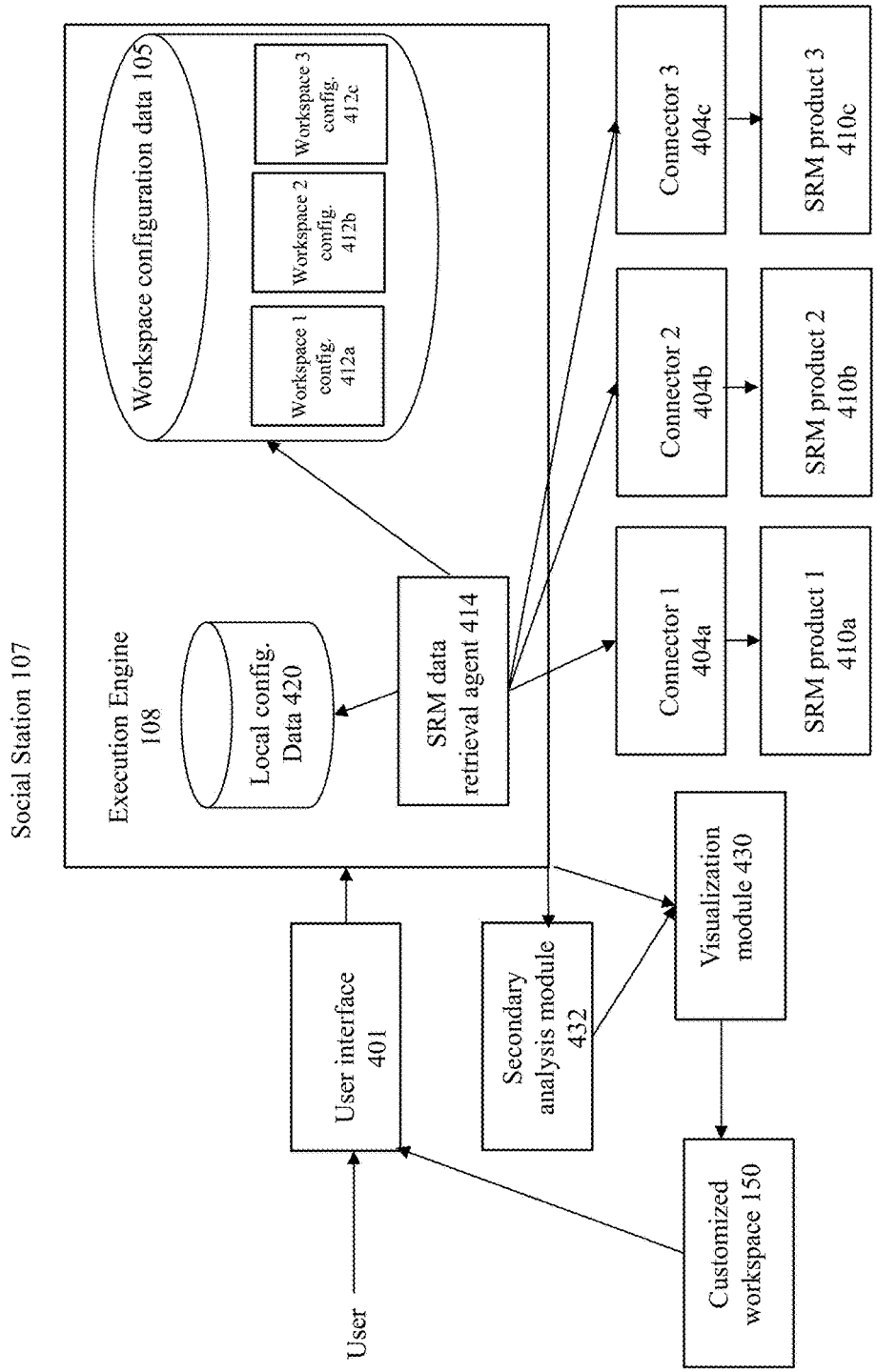
FIG. 4 illustrates an example embodiment of an execution engine which may be employed in some embodiments of the invention.

Referring now to FIG. 4, a detailed architecture of the execution engine 108 is provided. As shown in FIG. 4, the user interacts with the social station 107 through a user interface 401. The user interface 401 may comprise several user interface controls and/or elements that allow the user to perform a set of actions. As discussed above, the user interface 401 may have a drag-and-drop feature allowing users to drag and drop various modules into a customization template. Several other selection functions etc., may be provided through the user interface 401.

In one or more embodiments, the user may wish to view a particular workspace (e.g., a previously configured workspace). In response to a selection of a particular workspace, the execution engine 108 may retrieve a set of configuration parameters associated with the desired workspace from the workspace configuration database 105, as discussed above. As shown in FIG. 4, the database 105 may store configuration parameters pertaining to numerous workspaces configured by the user (e.g., 412a, 412b and 412c). In some embodiments, the configuration parameters of the various workspaces may be associated with the user. In other embodiments, the configuration parameters of the various workspaces may be associated with an entity or organization, and the user may have access to one or more of the workspaces configured for the entity.

In one or more embodiments, an entity may refer to a business. The business may be an enterprise or business organization that is engaged in an activity (e.g., selling of goods or services, etc.) for profit. The enterprise may be a large business organization (e.g., having more than 1000 employees, etc.) The enterprise may refer to any undertaking by an individual or group of individuals for profit. In one or more embodiments, the enterprise may be a business unit or firm (e.g., law firm). The enterprise may be a corporation, in one or more embodiments. In one or more embodiments, the entity may refer to a small business (e.g., having less than 1000 employees). The enterprise may deal with goods or services in any area (e.g., software, pharmaceuticals, engineering, manufacturing, etc.)

In other embodiments, the entity may refer to a non-profit organization. The non-profit organization may be an organization that uses surplus revenues to achieve a purpose or mission rather than using the revenues for profit. The entity may refer to any type of non-profit organization having any number of employees. In other embodiments, entity may refer to a government agency. The government agency may be a local governmental agency, a state government agency, a federal agency or even some international government agency. The government agency may provide may be a permanent or semi-permanent organization in a government that is responsible for oversight and administration of specific functions. The government agency may have any number of employees.

The entity may refer generally to any organization comprise a plurality of people, such as an institution that has a collective goal. In one or more embodiments, the entity may be an individual (e.g., a solo business owner, etc.). In one or more embodiments, an entity is a customer or tenant of a system that serves one or more tenants or one or more customers and offers services to employees or user accounts for the customer or tenant.

As discussed above, the configuration parameters may comprise details on the one or more modules selected, as well as detailed about the type of customization template that was selected for the workspace (e.g., dimensions, number of windows, coordinates etc.).

In one or more embodiments, the execution engine 108 may comprise an SRM data retrieval agent 414 that is configured to retrieve data from the appropriate SRM product to be displayed at the custom workspace 150. In other words, if the user has selected a module that is associated with SRM product 1, the data may need to be retrieved directly from a database associated with SRM product 1, and suitably displayed at the workspace 150.

To this end, the SRM retrieval agent 414 may be configured to consult the configuration parameters 412 associated with a selected workspace, and accordingly retrieve data from the one or more modules selected for the workspace. In some embodiments, connectors (e.g., 404a, 404b and 404c) may be used to connect to the SRM product (e.g., 410a, 410b and 410c) respectively. The connectors may 404 may initiate a secure connection to the respective SRM product, and send various commands to the SRM product in order to retrieve the necessary data from the SRM product database. In one or more embodiments, the connectors 404 may be a virtual bridge that helps communicate with other applications.

Thus, the SRM retrieval agent 414 may retrieve the necessary data in order to populate the custom workspace 150. In one or more embodiments, the SRM retrieval agent 414 may be configured to retrieve data as necessary (e.g., in response to a request). In other embodiments, the SRM retrieval agent 414 may be configured to periodically retrieve the data from the various SRM products 410 and store the retrieved data at a local database 420. Thus, the local data may be easily accessed in order to populate the custom workspace 150, and only new data (e.g., updates or changes) may need to be freshly retrieved from the various SRM products 410.

In one or more embodiments, the retrieved data along with the customization template, and the configuration parameters may be delivered to the visualization module 430 that is configured to package the data within the customization template in reference to the various configuration parameters associated for the custom workspace 150. In one or more embodiments, the visualization module 430 may format the data such that it may be displayed at the custom workspace 150. In other embodiments, the visualization module 430 may collect and manage the data corresponding to various graphics (e.g., received from the various SRM products). Data graphics may be stored in a graphic store (not shown), and may include maps, charts, graphs, and/or other any other image or visual representation of data.

In one or more embodiments, the visualization module 430 may be configured to generate data visualization corresponding to a data graphic. For example, the data graphic may be received from the SRM product to be populated in the custom workspace, and may need to be visualized.

In some embodiments, the data retrieved from the SRM data retrieval agents 414 may undergo additional analysis through a secondary analysis module 432 that is configured to analyze the data in a manner that is more closely related to what the user desires. For example, the data received from the SRM product 410 may not be analyzed based on criteria of specific interest to the user. Therefore, in some embodiments, the data may be additionally (or analyzed for the first time) through analysis module 432. Any type of data analysis or data modeling may be performed through the analysis module 432.

The analyze data may be delivered to the visualization module 430 for visualization. The visualization module formats the data, and populates the workspace 150, which may then be viewed by the user through the user interface 401.

Figure 5:
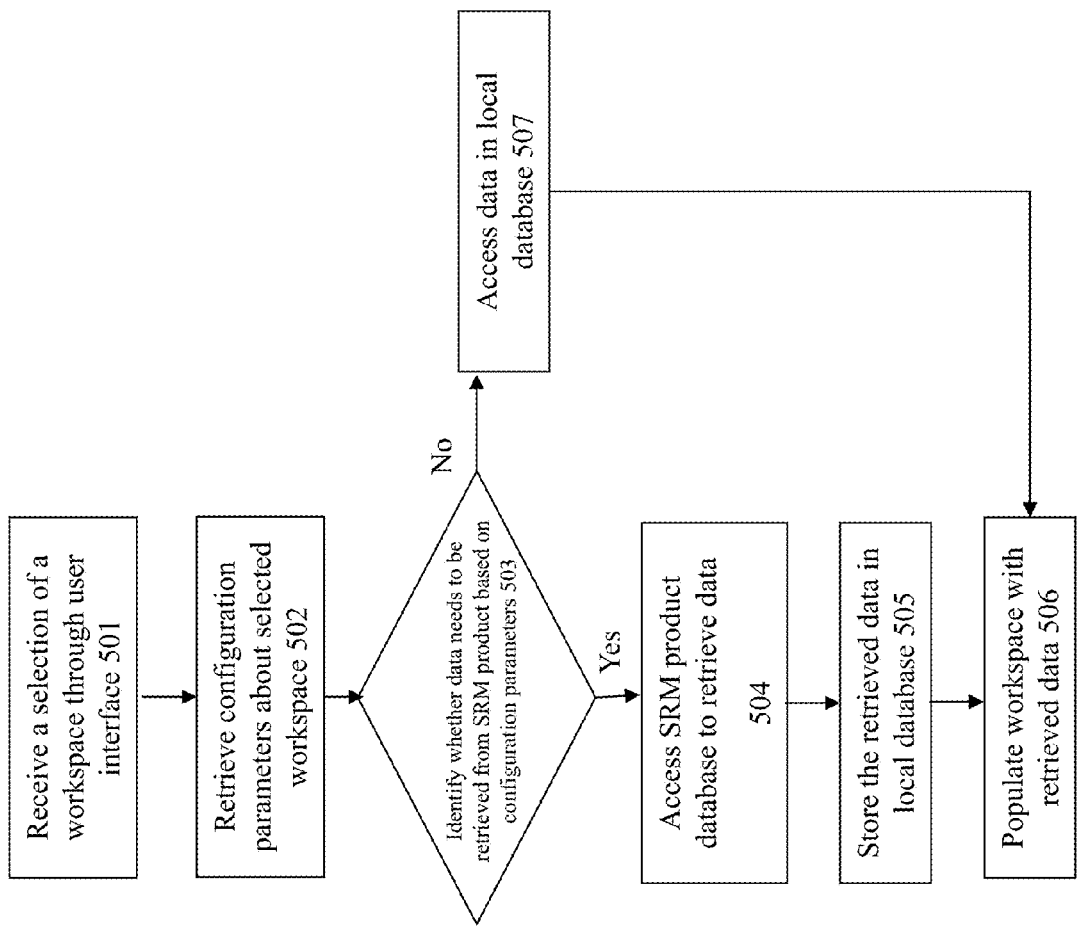
FIG. 5 shows a flowchart of a process of retrieving data to populate the customized workspace, according to some embodiments of the invention.

Referring now to FIG. 5, an example flowchart 500 of a method to execute the workspace is illustrated. At 501, a selection of one or more workspaces desired by the user is received. At 502, configuration parameters associated with the selected workspace are retrieved from the workspace configuration database. At 503, the system determines whether data needs to be retrieved from one or more SRM products.

If no data is to be retrieved from the SRM databases, the system access the local database to retrieve data to populate the workspace, at 507. If data is to retrieved from the SRM databases, the SRM product may be access to retrieve data at 504. At 505, the data is stored in the local database. At 506, the workspace is populated with the desired data.

Figure 6:
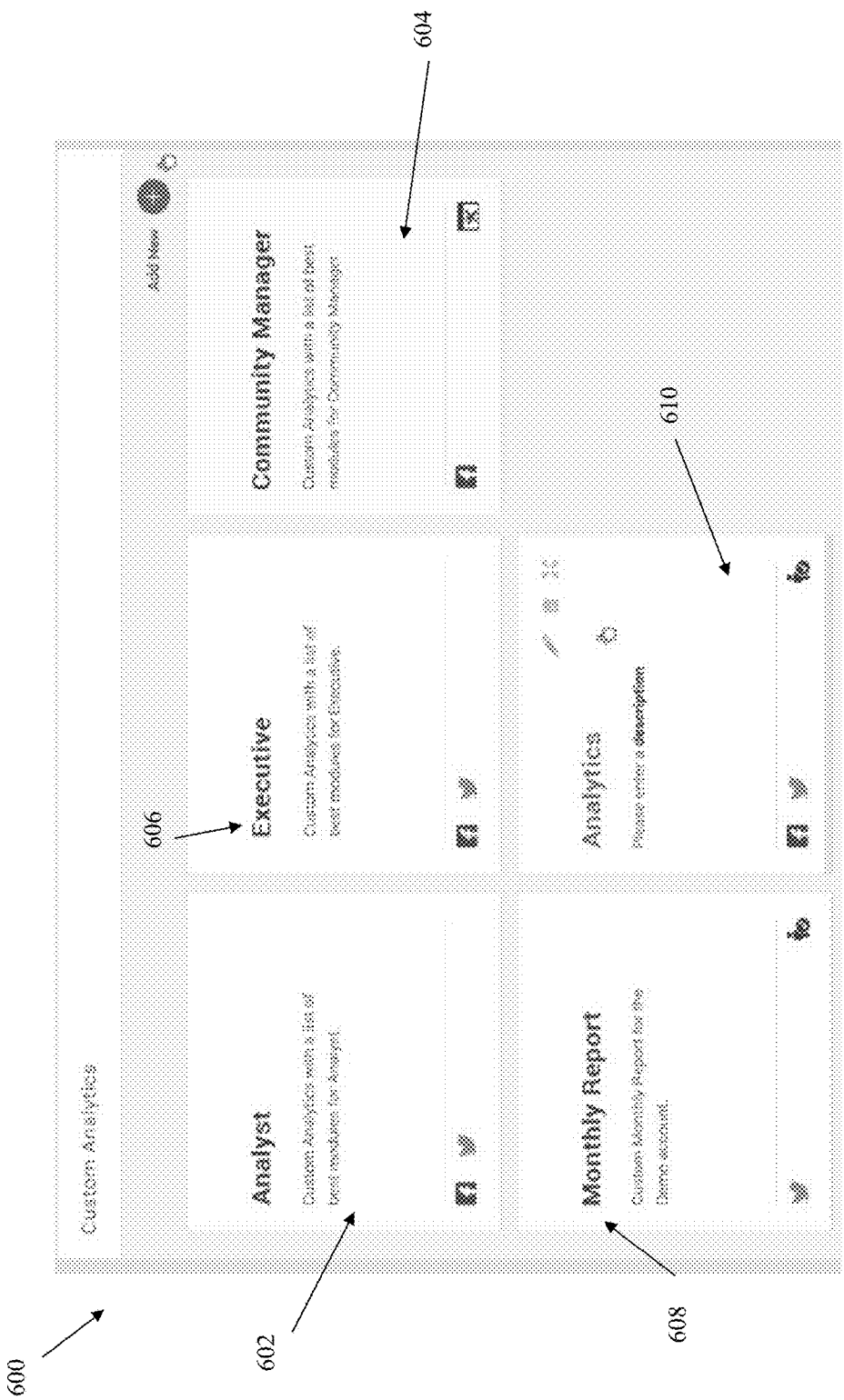
FIG. 6 illustrates an interface that includes multiple example workspaces configured for a user.

Using the mechanisms described above, a user may create/configure multiple workspaces, each having a different set of functionality relevant for the purpose of that workspace. FIG. 6 illustrates an interface 600 that includes multiple example workspaces configured for a user. Here, the different workspaces include (a) an Analyst workspace 602 to include a custom set of modules appropriate for an Analyst function, (b) an Executive workspace 606 to include custom analytics modules for the role of an executive, (c) a Community Manager workspace 604 having custom modules for the role of a community manager, (d) a Monthly Report workspace 608 having modules to handle reporting functions, and (e) an Analytics workspace 610 to include a custom set of module to perform analytics functions. As just a simple example, consider the Community Manager workspace 604, where the workspace may be configured to include modules to perform functionality to implement (i) publishing capabilities (ii) engagement functions (iii) analytics, and (iv) functions to listen and track social data. Similarly, the other workspaces may include modules that are most relevant to the user's role.

Figure 7:
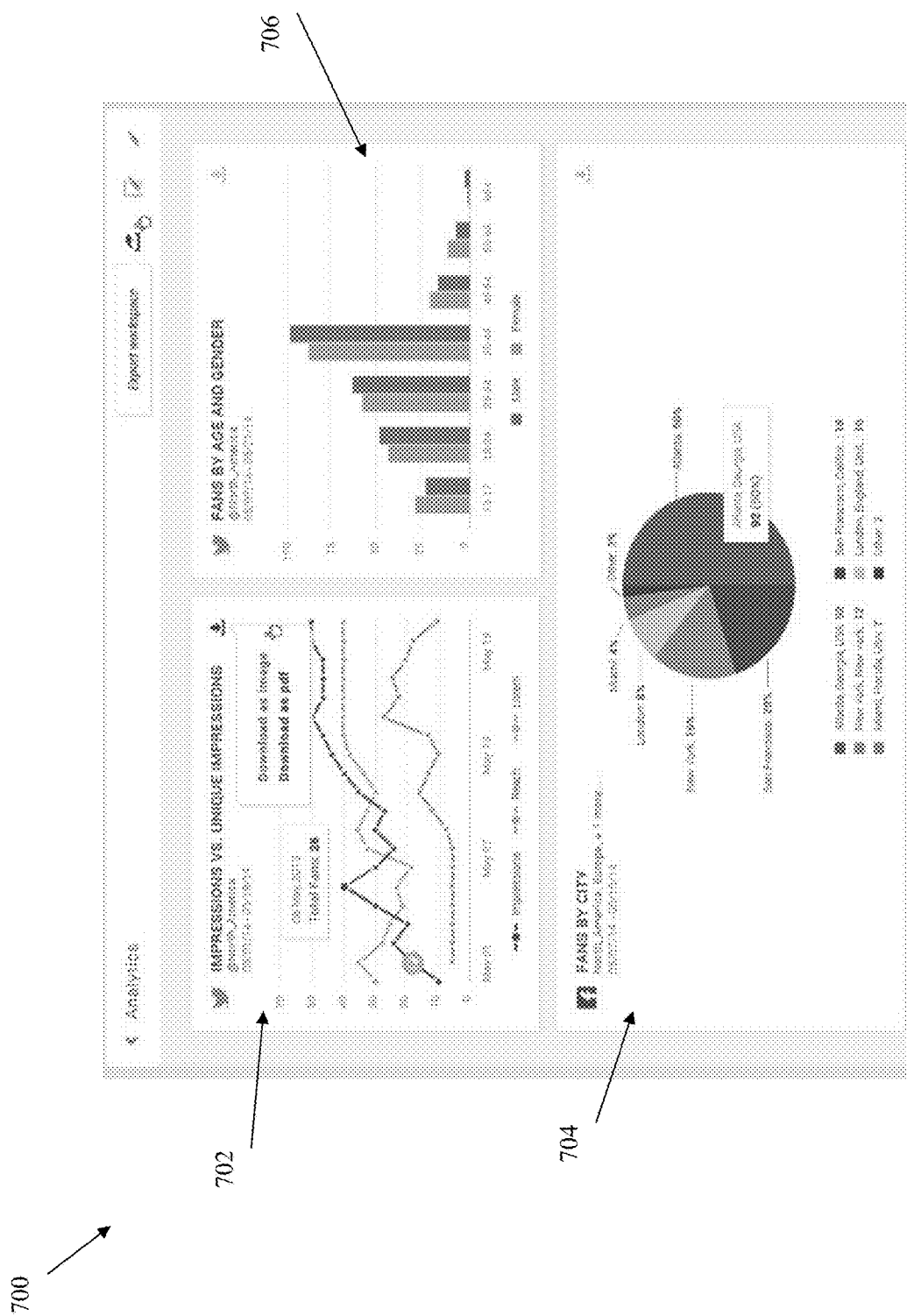
FIG. 7 illustrates an example workspace having three different modules.

The workspace can be configured to include multiple modules, and to also configure the placement and organization of the modules within the workspace, as discussed above. FIG. 7 illustrates an example workspace 700 having three different modules (e.g., 702, 704 and 706), where the modules are organized in their placement such that top row include two side-by-side modules (e.g., 702 and 706) and the bottom row include only a single module (e.g., 704). As discussed above, any such configuration may be selected by the user. Another workspace may include 4 modules in the workspace. Yet another workspace may include just 2 large windows that are place side-by-side. Similarly, any configuration may be selected by the user (e.g., through a customization template, as discussed above).

Figure 8:
FIG. 8 illustrates an example notes object that has been inserted and configured for a workspace.

The workspace can also be configured to include notes objects on the workspace. FIG. 8 illustrates an example notes object 802 that has been inserted and configured for a workspace 800. The placement of the notes can also be configured, e.g., by dragging and dropping the notes object to the appropriate location on the workspace. In one or more embodiments, several annotation tools may be provided on the workspace. The tools may be used to annotate a particular module, or workspace, or to remind the user of an important topic in the future. For example, a particular graph may have an unusual data point.

The user may use a note object to associate the data point to the note object, or else simply place the note object close to the data point such that the note may be easily accessed and viewed at a later time. This may be especially help in collaboration projects. If the same workspace is being viewed by multiple users, a first user may use a note object such that it may be helpful for a second user viewing the same data modules at a later time.

Figure 9:
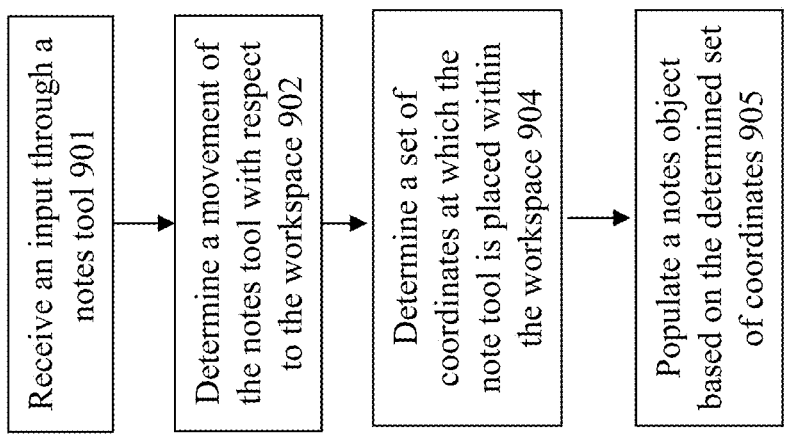
FIG. 9 shows a flowchart of a process of inserting a notes object into a workspace.

Referring now to FIG. 9, an example flowchart 900 depicting a method to populate a posting object is illustrated. It should be appreciated that other such methods may be similarly used. At 901, the system receives an input through a designated notes tool. For example, the workspace may display a set of annotation tools, which includes a notes tool. For example, the user may click on the notes tool, which may populate a notes icon, which may then be placed anywhere within the workspace.

At 902, a movement of the notes tool may be determined relative to the workspace, and a set of coordinates at which it is locked may be determined (903). In some embodiments, the set of coordinates may be tied to a set of coordinates or configuration parameters of the workspace (e.g., certain data objects of the workspace may be tied to the note object, etc.). At 904, the note object may be populated at the determined set of coordinates. The user may then simply click on the notes object and begin typing any desired note.

Figure 10:
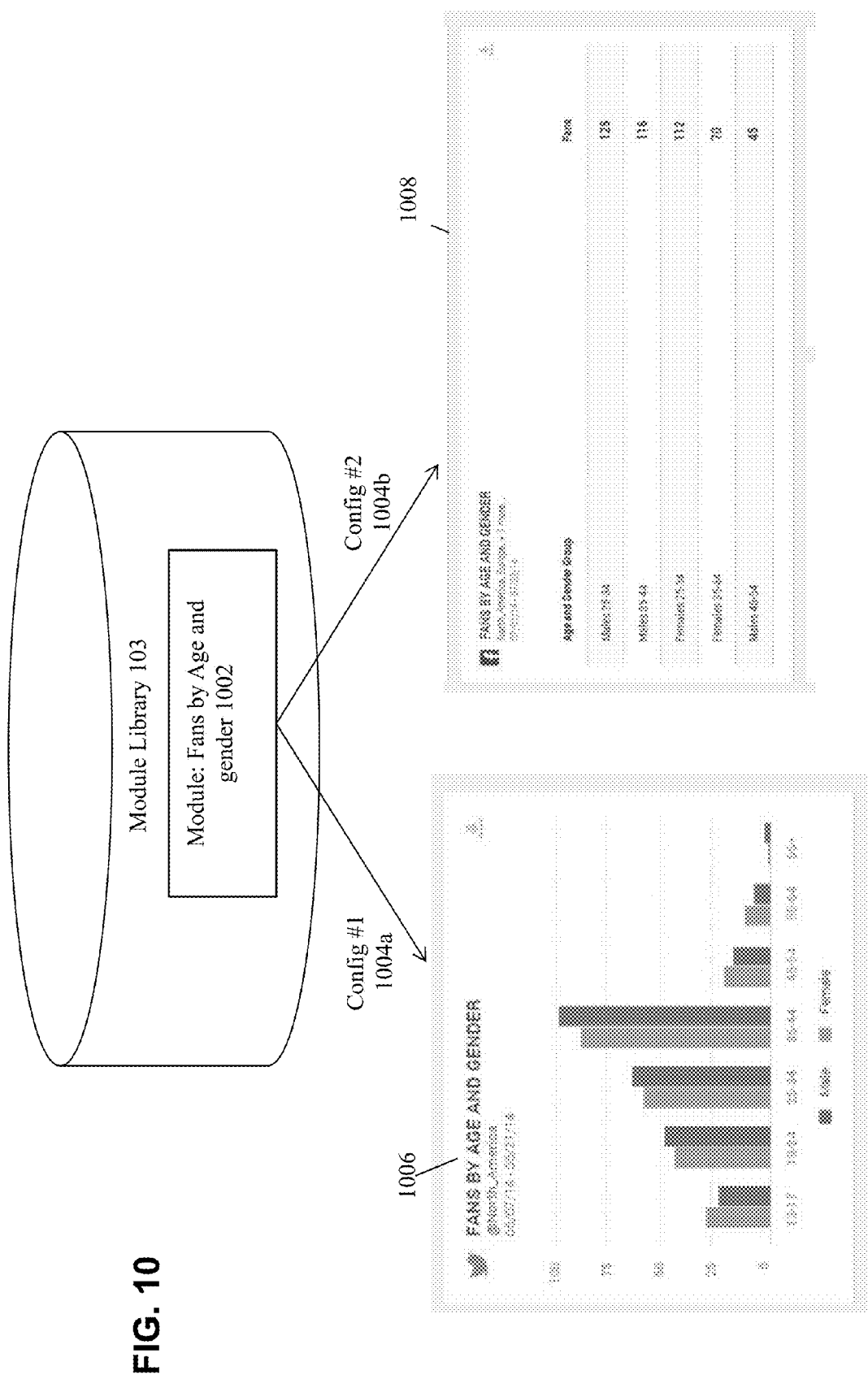
FIG. 10 illustrates a configurable module from the module library.

In one or more embodiments, the modules themselves can be customized to adjust the properties under which the module is executed and displayed. In fact, the same module can be configured to operate differently, even on the same workspace. FIG. 10 illustrates a module 1002 from the module library that can be used to perform analytics functionality in the SRM system to determine the number of fans in a social network site by age and gender. In a first example configuration setting for this module, the module 1002 can be configured (1004a) to perform analytics for a first social network site (i.e., Twitter), for a first location (i.e., North America), for a first date range (i.e., May 7, 2014-May 21, 2014), and for the analytics data to be displayed using a first display interface type (i.e., bar chart). In a second example configuration setting (1004b) for this module, the module can be configured to perform analytics for a second social network site (i.e., Facebook), for a second set of locations (i.e., North America, Europe, and 1 other location), for a second date range (i.e., Jul. 1, 2014-Jul. 22, 2014), and for the analytics data to be displayed using a second display interface type (i.e., tabular chart).

In one or more embodiments, as discussed above, the analysis may be done at the SRM product itself, in which case the analyzed data for one social network may be pulled directly from the module itself, through the connectors. In other words, the configuration workspace data 105 may store an identification of the table at the SRM product, such that two different tables of the same module are accessed to populate the first and second window of the workspace. In other embodiments, if analysis is not performed at the SRM product, the database having all the data may be accessed, and the analysis and visualization may be performed at the social station 107.

Figure 11:
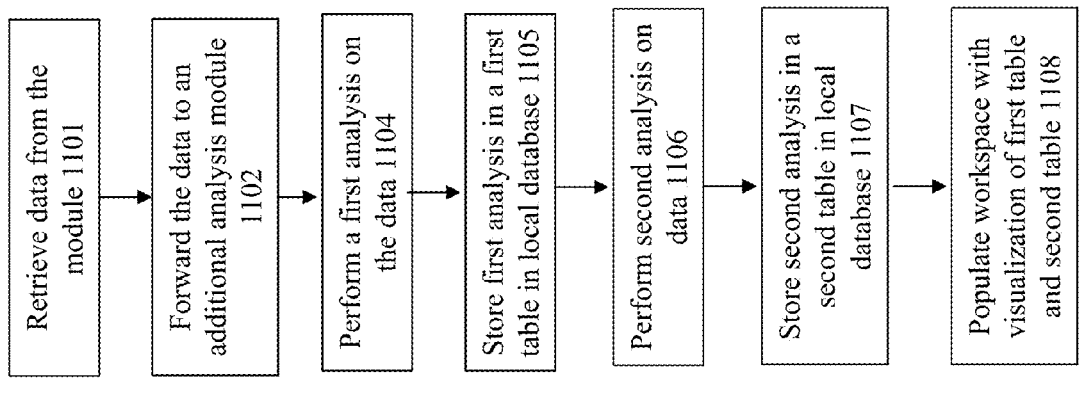
FIG. 11 shows a flowchart of a process of retrieving data from a configurable module.

Referring now to FIG. 11, an example flowchart 1100 of using the same module to populate two windows of a workspace is illustrated. At 1101, data is retrieved from a defined module of a particular SRM product. At 1102, the data may be forwarded to an additional analysis module (as discussed above). At 1103, a first analysis having a first set of filters or functions defined by the user is performed on the data. At 1104, the first analyzed data is stored at a first table. Similarly, the process is repeated for anther set of filters or functions defined by the user, and is stored in the second table (1105 and 1106). At 1107, data from the two tables may be forwarded to the visualization module, and populated at two separate windows of the same workspace, as illustrated in FIG. 10.

Figure 12:
FIG. 12 shows an example workspace according to some embodiments.

FIG. 12 shows an example workspace having many of the workspace and module configurations described above, including (a) selection of modules for the workspace; (b) configuration of the modules; (c) having the same module displayed twice with different configurations for each module; (d) configuration of the placement of modules on the workspace; and (e) insertion and configuration of notes onto the workspace.

Figure 13:
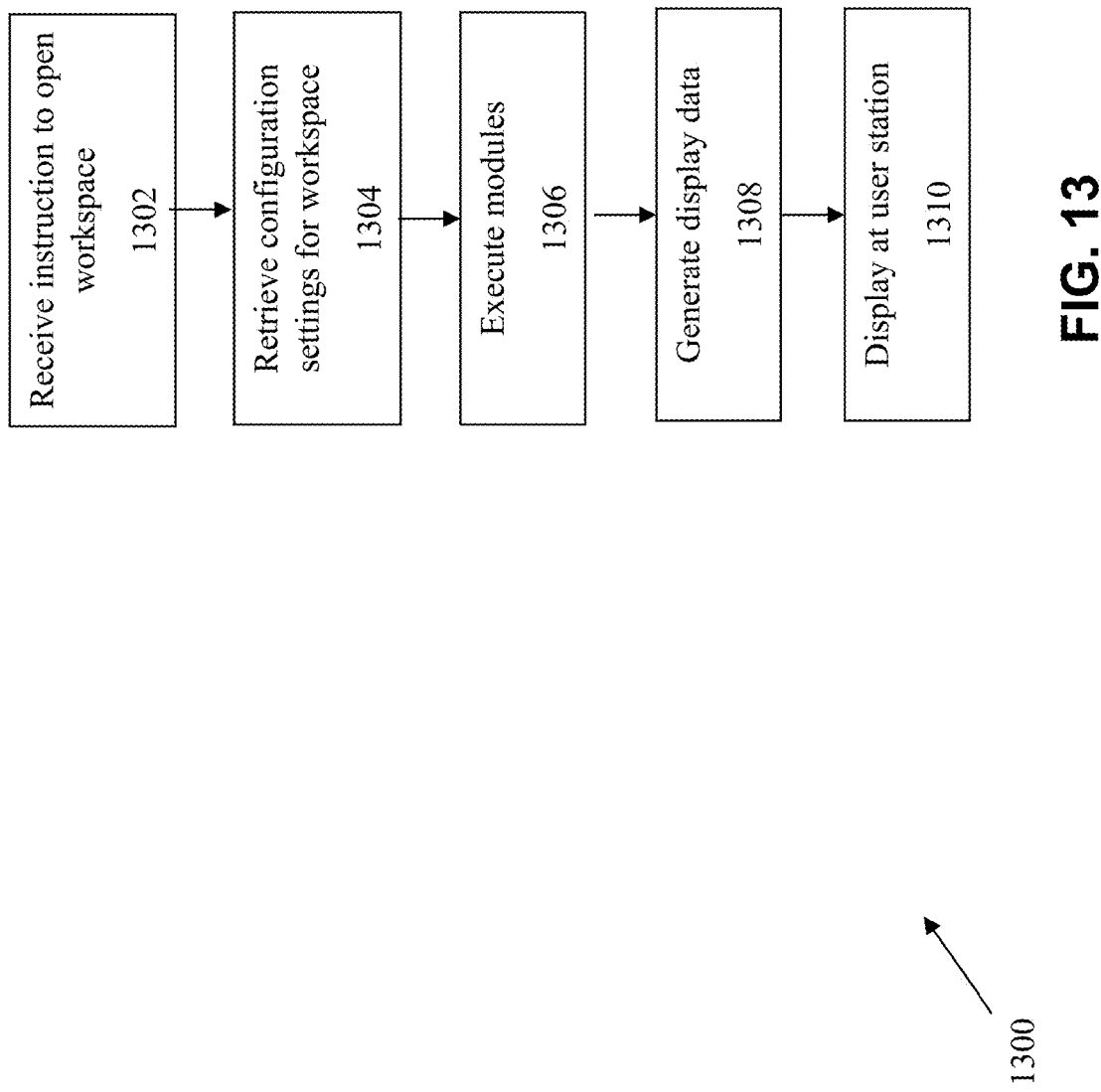
FIG. 13 shows a flowchart of an approach to use an execution engine to implement the workspace according to some embodiments of the invention.

FIG. 13 shows a flowchart 1300 of an approach to implement the workspace according to some embodiments of the invention. At 1302, instructions are received by the SRM system to open a workspace. This may occur, for example, when the user selects a workspace in the user interface to be opened, e.g., by selecting one of the workspaces shown in FIG. 3.

Next, at 1304, configuration settings are retrieved for the workspace. The configuration settings for the workspace may be retrieved from a configuration repository within the SRM system.

At 1306, the modules within the workspace are executed. As noted above, the modules may pertain to functionality for multiple products within the SRM product suite. Therefore, calls may be performed against multiple different SRM products from within the one workspace.

The execution of the modules will result in the generation of display data at 1308. The UI display may include display data for the different modules as well as notes inserted into the workspace. Thereafter, at 1310, the UI data can then be sent to the user station to be displayed to the user.

In some cases, the output from the modules can be exported to an external system. For example, the workspace data can be exported by converting the module data into a different data representation understandable by the target system, e.g., by conversion into a spreadsheet or csv format.

In one or more embodiments, the workspace may be configured to include a "Quickpost" functionality that allows users to directly make a posting based on the data viewed on the workspace to one or more streams associated with the organization or entity. Given that the configured modules of the workspace display various types of helpful analytics about social media data, it is often advantageous to make a post on one or more social networks while simultaneously viewing the analytics data on the same interface screen. For example, the user, upon viewing analytics data related to product revenue in relation to posting times of content on various social networks may make a Quickpost regarding the best time to post on social networks. Or, in another example, the user, upon viewing analytics data related to age and gender of users of one or more social media page(s) may make a Quickpost keeping the analytics data in mind. Therefore, rather than navigate through a separate screen, the Quickpost functionality allows users to quickly make a post on the same workspace screen.

Figure 14:
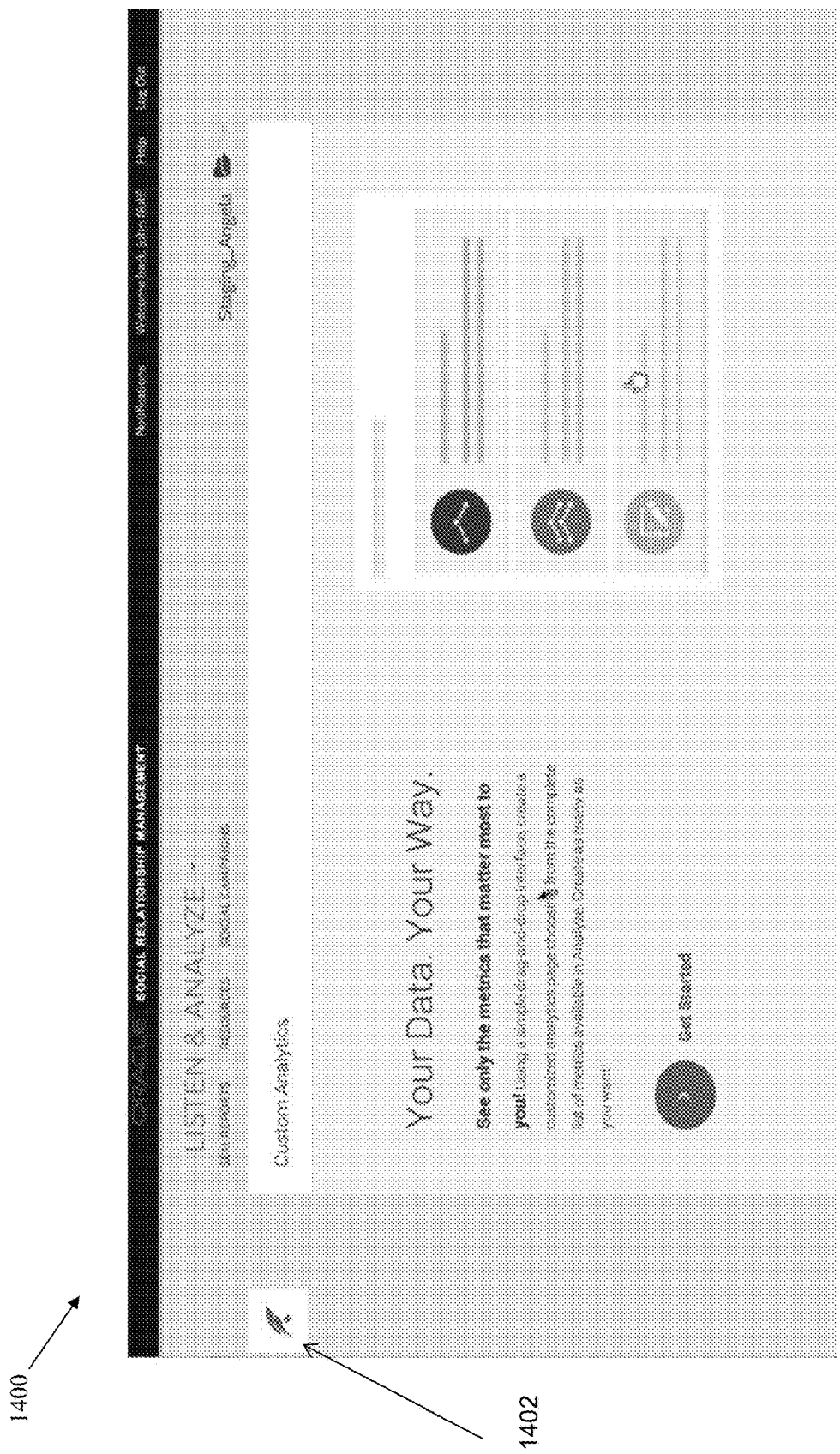
FIG. 14 illustrates an example interface showing a Quick-post icon according to some embodiments.

FIG. 14 illustrates an exemplary embodiment of a workspace interface 1400 that includes a Quickpost icon 1402. In the illustrated embodiment, the Quickpost icon 1402 is a clickable button that may be selected through a mouse interface. In one embodiment, the button 1402 is actuated to display the contents of the posting object. In another embodiment, the user may move the mouse interface over the button 1402 to display the contents of the posting object. In the example embodiment, the Quickpost posting object is an expandable view object that populates when the button 1402 is actuated. In other embodiments, the posting object may be a pop-up screen that may be viewed simultaneously with the workspace interface screen. Other similar embodiments may be similarly implemented.

Figure 15:
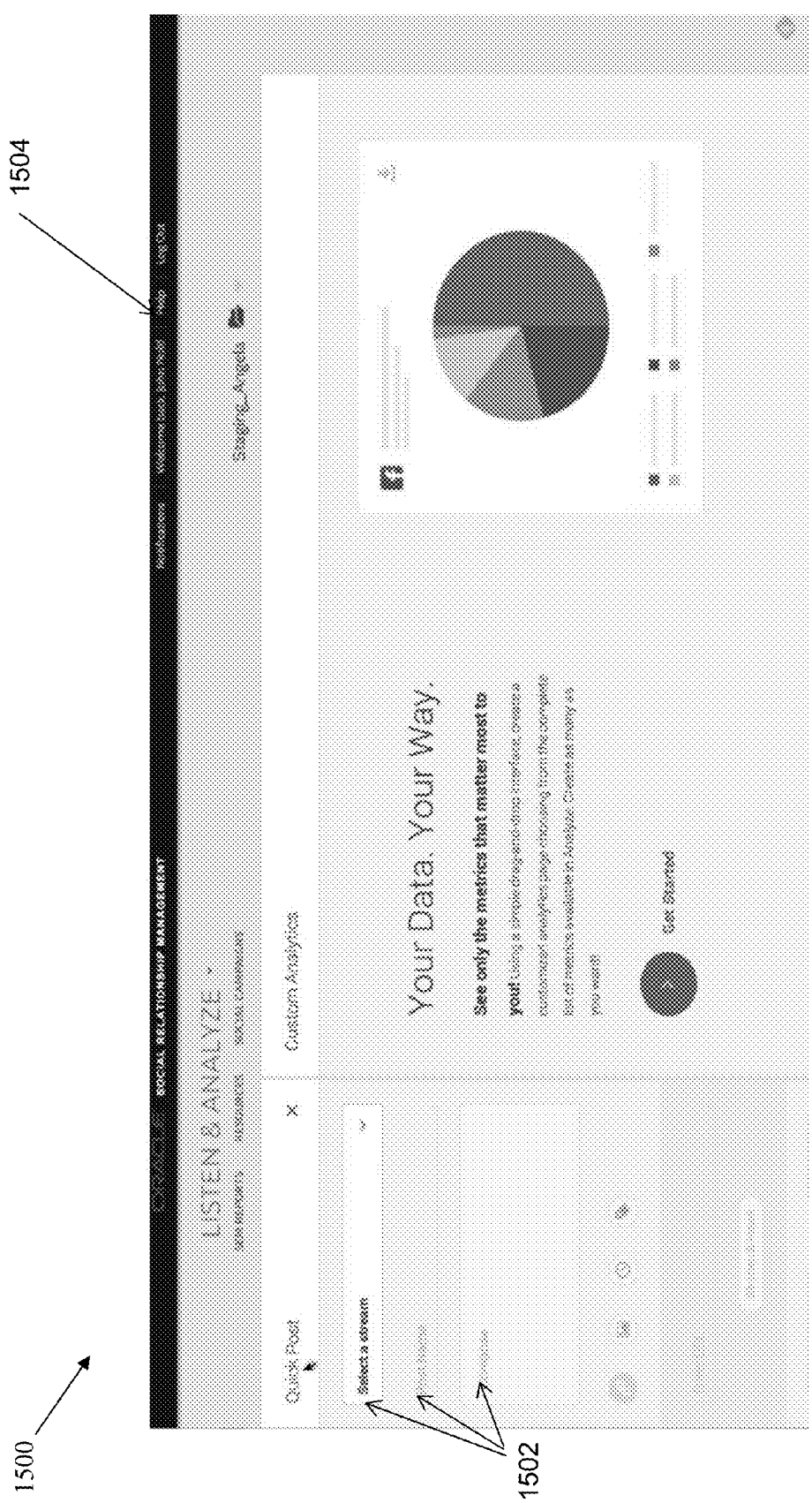
FIG. 15 illustrates the example interface of FIG. 14 showing an expandable view of the Quickpost functionality according to some embodiments.
Figure 16:
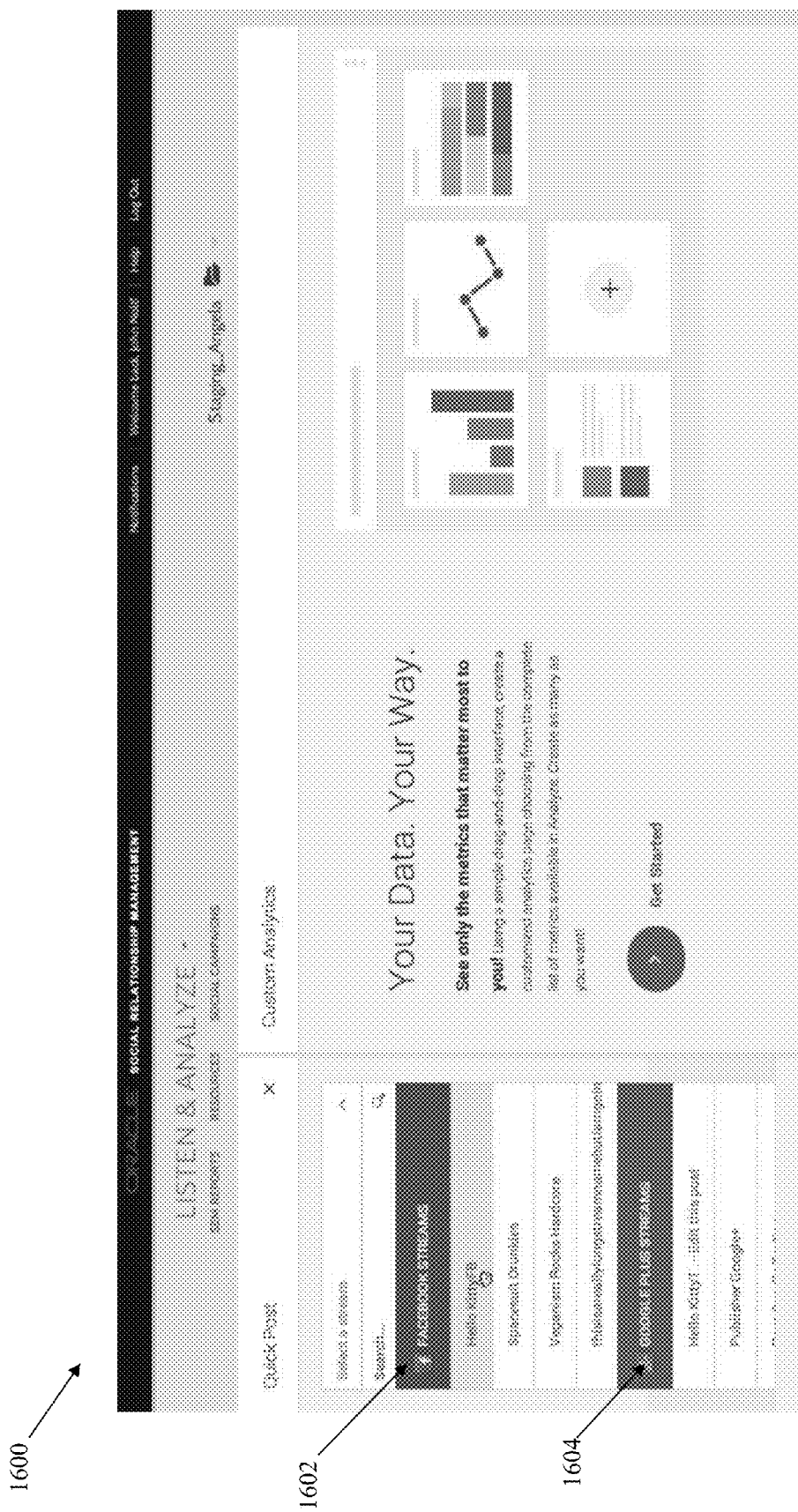
FIG. 16 illustrates an example interface of FIG. 14 showing additional fields of the Quickpost according to some embodiments.

FIG. 15 illustrates an expanded view 1500 of the Quickpost icon 1402. The Quickpost posting object has several selectable fields 1502, including "Select a stream," "post name," "compose," etc. Other embodiments may comprise other relevant fields. Each of the fields 1502 have controls that permit the user to select and/or enter data as desired by the user. Referring now to FIG. 16, when the "Select a stream" field 1502 is actuated, a set of available social network streams (e.g., 1602 and 1604) are displayed for the user to select from. Here, in the example embodiment, there are multiple Facebook® streams (1602) along with streams of other social networks (1604) as well (e.g., Google® Plus). It should be appreciated that controls are provided to the user such that the user can scroll through the available streams and select one or more through a mouse interface.

Figure 17:
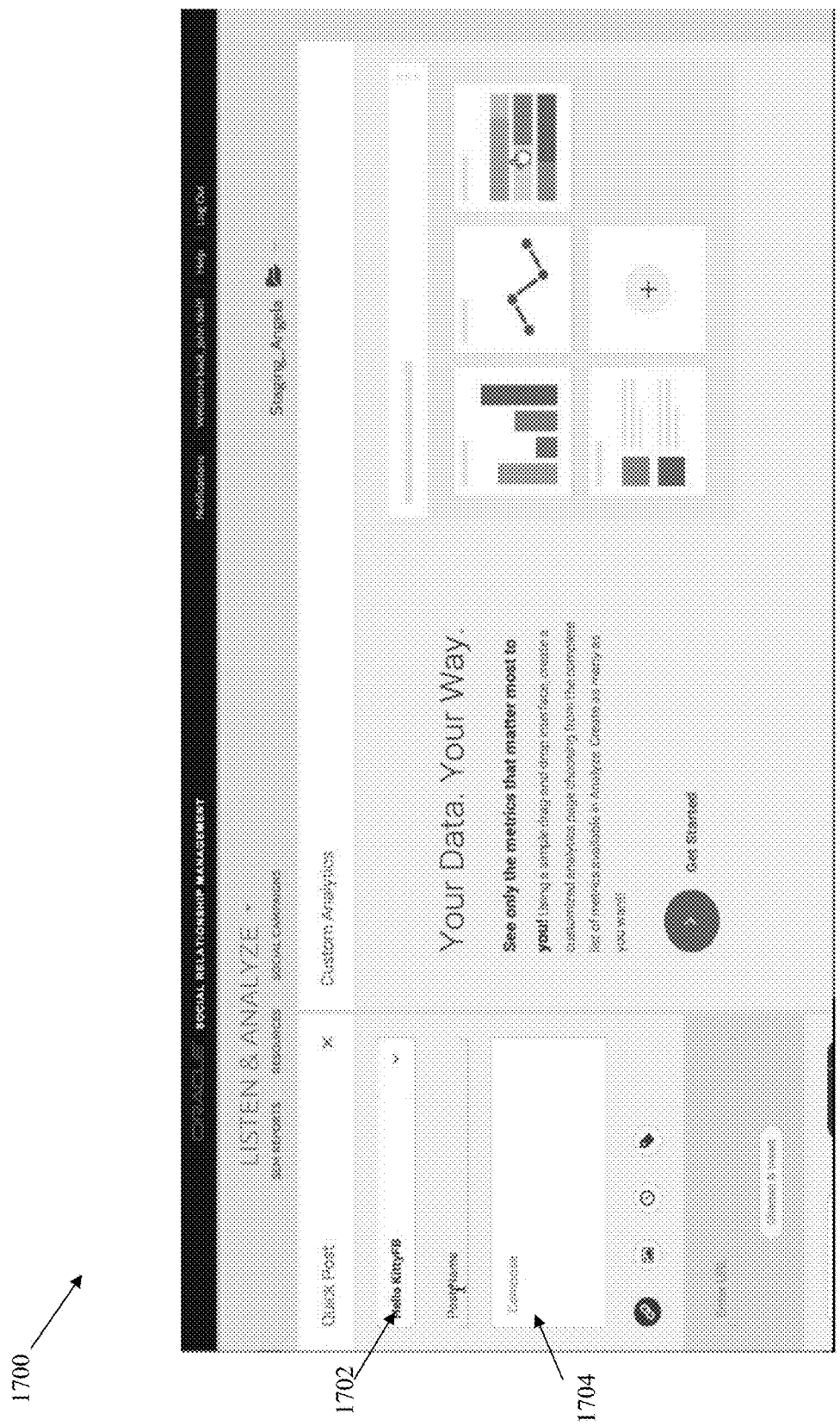
FIG. 17 illustrates an example interface of FIG. 14 showing selected fields of the Quickpost according to some embodiments.

Continuing with the same example, in FIG. 17, in user interface 1700, the user has selected a desired stream, "HelloKittyFB" stream 1702 on which to post the Quickpost. The user may also enter in a name of the post and compose the message (1704) using the "Post Name" and "Compose" fields. Once the message has been composed, the user may actuate a "Post" button (not shown) to post the Quickpost on the desired social network stream. Additional capabilities, including posting pictures, attachments, links, shortening URL links, etc. may also be available to the user in making the Quickpost.

Figure 18:
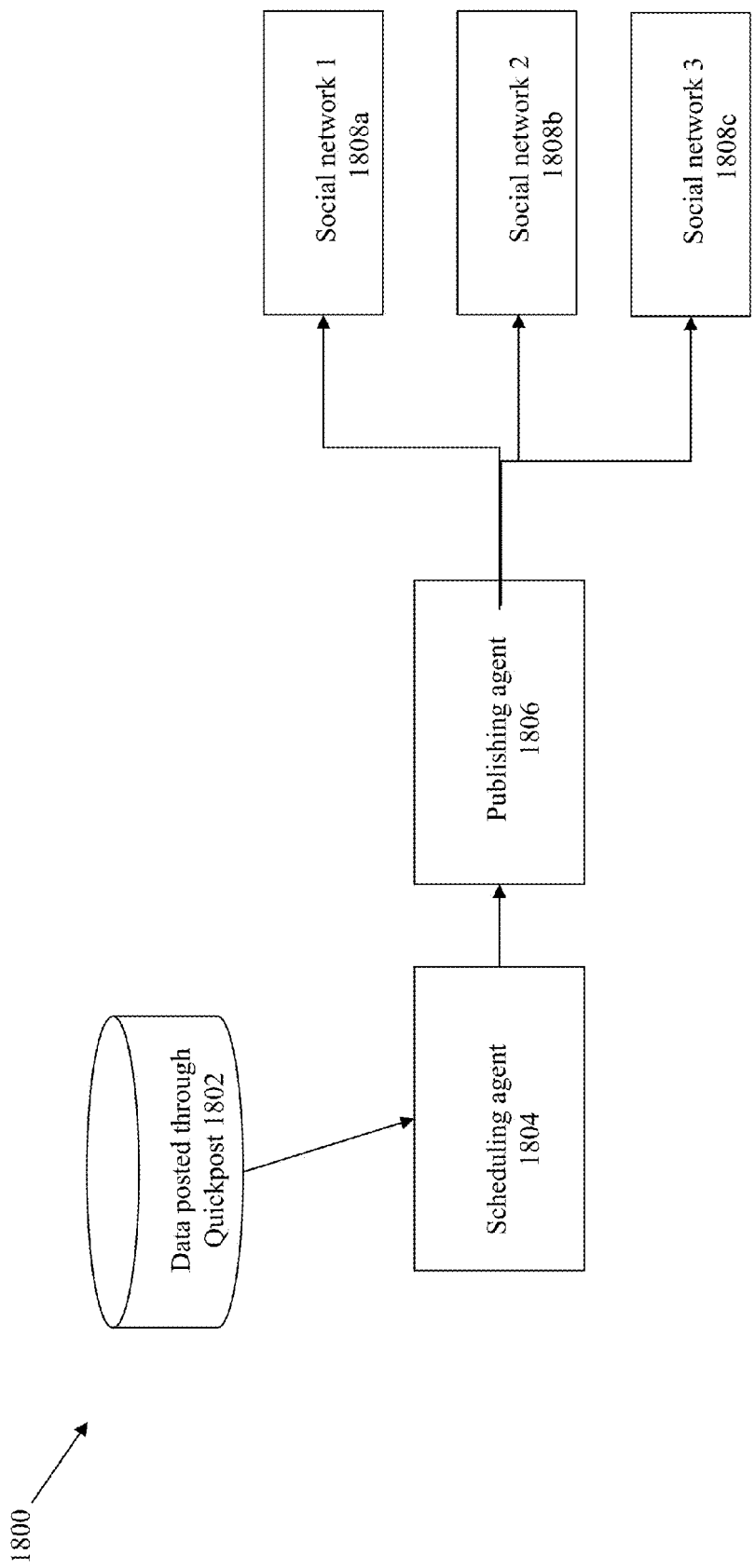
FIG. 18 illustrates an example embodiment of components that publish data to a plurality of social networks, according to some embodiments.

Referring now to FIG. 18, an example architecture 1800 illustrating how Quickposts may be used to directly publish data onto the various social networks is illustrated. As shown in FIG. 18, the data captured from the Quickpost may be captured in a local database 1802. The local database may comprise numerous tables for the various users and/or entities. The data from the local database 1802 may be retrieved by a scheduling agent 1804 that is configured to determine whether the post on the website is to be made immediately or whether the post is defined to be made at some other later time in the future. If the post is to be made immediately, the data may be transmitted to a publishing agent 1804.

If the post is to be made in the future, the scheduling agent 1804 may determine, based on metadata associated with the post, a time defined by the user. Based on the scheduled time defined by the user, the scheduling agent 1804 may create a scheduling task such that a scheduled time is used as a trigger at which to transmit the data to the publishing agent 1804.

The publishing agent 1806 may be configured to directly post on one or more social networks (1808a, 1808b and/or 1808c). The publishing agent 1806 may connect to the various social networks through an API layer that comprises a set of authorization credentials and parameters regarding the different types of posts possible for each of the social networks. In one or more embodiments, the publishing agent 1806 may access a rules database (not shown) to retrieve publishing rules particular to the social network, and make automatic changes (e.g., shortening of a link, etc.) based on the retrieved rules. In one or more embodiments, the publishing agent 1806 may be configured to format and/or modify the post based on the retrieved rules.

Figure 19:
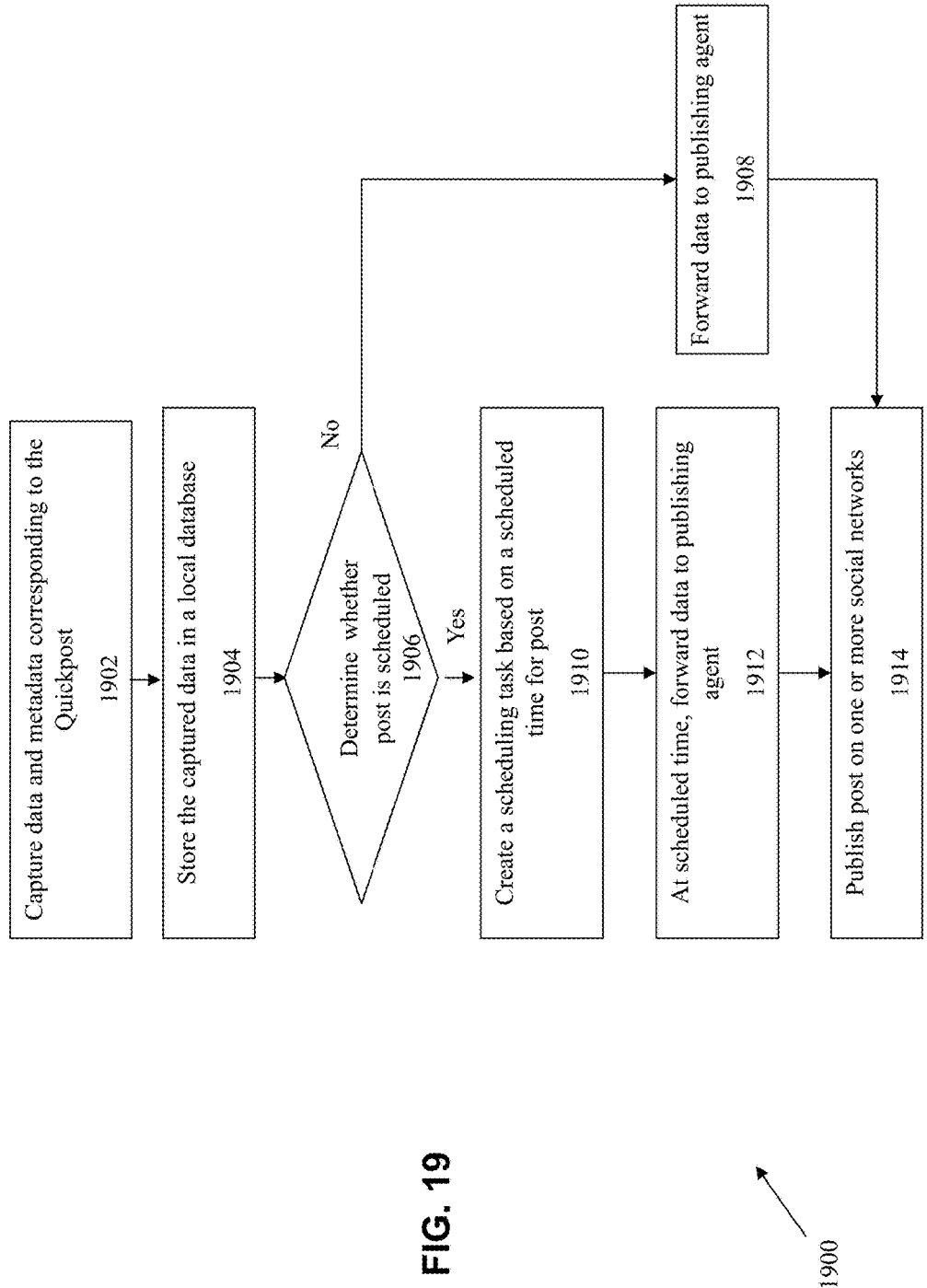
FIG. 19 shows an example flowchart of publishing data to a plurality of social networks through the Quickpost functionality.

Referring now to FIG. 19, an example flowchart 1900 of publishing the Quickpost on various social networks is illustrated. At 1902, a set of data and metadata about the Quickpost is captured. At 1904, the data and metadata may be stored at a local database. At 1906, it may be determined whether the post is scheduled to be posted at a later time. If there is no scheduled time, the data may be transmitted directly to a publishing agent, at 1908.

If it is determined that the Quickpost defined a scheduled time (e.g., through the metadata, content, etc.), a scheduling task may be created based on the scheduled time, at 1910. At 1912, the data may be forwarded to the publishing agent at the scheduled time. At 1914, the post may be published at a plurality of social networks.

Therefore, what has been described is an improved system, method, and computer program product for implementing an integrated and/or customized workspace for a social relationship management system.

System Architecture Overview

FIG. 20 is a block diagram of an illustrative computing system 2000 suitable for implementing an embodiment of the present invention. Computer system 2000 includes a bus 1406 or other communication mechanism for communicating information, which interconnects subsystems and devices, such as processor 2007, system memory 2008 (e.g., RAM), static storage device 2009 (e.g., ROM), disk drive 2010 (e.g., magnetic or optical), communication interface 2014 (e.g., modem or Ethernet card), display 2011 (e.g., CRT or LCD), input device 2012 (e.g., keyboard), and cursor control.

According to one embodiment of the invention, computer system 2000 performs specific operations by processor 2007 executing one or more sequences of one or more instructions contained in system memory 2008. Such instructions may be read into system memory 2008 from another computer readable/usable medium, such as static storage device 2009 or disk drive 2010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2007 for execution. Such a medium may take many forms, including but not limited to, non-volatile media and volatile media. Non-volatile media includes, for example, optical or magnetic disks, such as disk drive 2010. Volatile media includes dynamic memory, such as system memory 2008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 2000. According to other embodiments of the invention, two or more computer systems 2000 coupled by communication link 2015 (e.g., LAN, PTSN, or wireless network) may perform the sequence of instructions required to practice the invention in coordination with one another.

Computer system 2000 may transmit and receive messages, data, and instructions, including program, i.e., application code, through communication link 2015 and communication interface 2014. Received program code may be executed by processor 2007 as it is received, and/or stored in disk drive 2010, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A system, comprising:
one or more hardware processors; and one or more one or more non-transitory computer-readable media storing instructions, which when executed by the one or more hardware processors, cause execution of operations comprising:
displaying one or more user interface elements for accessing a module library, the module library comprising a plurality of social relationship management (SRM) modules, wherein each SRM module in the plurality of SRM modules is associated, respectively, with a particular SRM application in a plurality of SRM applications;
receiving, via the one or more user interface elements, first user input selecting a subset of SRM modules from the plurality of SRM modules;
generating, based at least in part on the first user input, a set of workspace configuration parameters corresponding to a integrated visual workspace comprising the subset of SRM modules; and
generating, based on the set of workspace configuration parameters, a graphical user interface (GUI) comprising the integrated visual workspace.

2. A method, comprising:
displaying one or more user interface elements for accessing a module library, the module library comprising a plurality of social relationship management (SRM) modules, wherein each SRM module in the plurality of SRM modules is associated, respectively, with a particular SRM application in a plurality of SRM applications;
receiving, via the one or more user interface elements, first user input selecting a subset of SRM modules from the plurality of SRM modules;
generating, based at least in part on the first user input, a set of workspace configuration parameters corresponding to a integrated visual workspace comprising the subset of SRM modules; and
generating, based on the set of workspace configuration parameters, a graphical user interface (GUI) comprising the integrated visual workspace,
wherein the method is performed by at least one device comprising a hardware processor.

3. A non-transitory computer readable medium comprising instructions which, when executed by one or more hardware processors, cause performance of operations comprising:
displaying one or more user interface elements for accessing a module library, the module library comprising a plurality of social relationship management (SRM) modules, wherein each SRM module in the plurality of SRM modules is associated, respectively, with a particular SRM application in a plurality of SRM applications;
receiving, via the one or more user interface elements, first user input selecting a subset of SRM modules from the plurality of SRM modules;
generating, based at least in part on the first user input, a set of workspace configuration parameters corresponding to a integrated visual workspace comprising the subset of SRM modules; and
generating, based on the set of workspace configuration parameters, a graphical user interface (GUI) comprising the integrated visual workspace,
wherein the method is performed by at least one device comprising a hardware processor.

4. The medium of claim 3, wherein the one or more user interface elements for accessing the module library comprises a list of the plurality of SRM modules.

5. The medium of claim 3, wherein the one or more user interface elements for accessing the module library comprises a search function for searching among the plurality of SRM modules.

6. The medium of claim 3, wherein the first user input comprises dragging and dropping each SRM module in the subset of SRM modules from the module library to respective placements in the integrated visual workspace.

7. The medium of claim 3, the operations further comprising:
configuring, based on second user input, one or more operational parameters for at least one SRM module in the subset of SRM modules.

8. The medium of claim 7, wherein the one or more operational parameters comprises one or more of a data source, a display preference, or a query date to be used with the at least one SRM module.

9. The medium of claim 3, wherein generating the set of workspace configuration parameters is further based, at least in part, on a preconfigured workspace customization template.

10. The medium of claim 3, the operations further comprising:
storing the set of workspace configuration parameters in a database;
detecting second user input requesting presentation of the GUI; and
retrieving, responsive to detecting the second user input, the set of workspace configuration parameters from the database.

11. The medium of claim 10, wherein the set of workspace configuration parameters comprises one or more operational parameters associated with one or more SRM modules in the subset of SRM modules.

12. The medium of claim 3,
wherein a first SRM module in the subset of SRM modules is configured to communicate, via a first connector, with a first SRM application in the plurality of SRM applications, and
wherein a second SRM module in the subset of SRM modules is configured to communicate, via a second connector, with a second SRM application in the plurality of SRM applications.

13. The medium of claim 3, the operations further comprising:
receiving first SRM data from a first SRM application in the plurality of SRM applications, the first SRM application being associated with a first SRM module in the subset of SRM modules; and
generating a first analysis of the first SRM data,
wherein the first SRM module is configured to present the first analysis of the first SRM data as part of the integrated visual workspace.

14. The medium of claim 13, the operations further comprising:
receiving second SRM data from a second SRM application in the plurality of SRM applications, the second SRM application being associated with a second SRM module in the subset of SRM modules; and
generating a second analysis of the second SRM data,
wherein the second SRM module is configured to present the second analysis of the second SRM data as part of the integrated visual workspace.

15. The medium of claim 3, the operations further comprising:

detecting, via the integrated visual workspace, second user input indicating a placement of a note in the integrated visual workspace; and populating, based on the second user input, the note at the placement indicated.

16. The medium of claim 3, the operations further comprising:

detecting, via the integrated visual workspace, second user input comprising social media message content; and publishing, based on the second user input, the social media message to a social media platform managed by at least one SRM application in the plurality of SRM application.

17. The medium of claim 3, wherein a first SRM application in the plurality of SRM applications is configured to publish messages to a plurality of social media platforms, and wherein a second SRM application in the plurality of SRM application is configured to generate analytics for the plurality of social media platforms.

18. The medium of claim 3, wherein the set of workspace configuration parameters is associated with a first user of the GUI and not associated with a second user of the GUI.

19. The medium of claim 3, the operations further comprising:

detecting second user input indicating a modification to the integrated visual workspace; and modifying, based on the second user input, the set of workspace configuration parameters.

20. The medium of claim 3, wherein the set of workspace configuration parameters comprises one or more of module dimensions, module coordinates, or module identities.

* * * * *

UNITED STATES PATENT AND TRADEMARK OFFICE
CERTIFICATE OF CORRECTION

PATENT NO. : 10,083,490 B2  
APPLICATION NO. : 14/828466  
DATED : September 25, 2018  
INVENTOR(S) : Williams, II et al.

Page 1 of 1

It is certified that error appears in the above-identified patent and that said Letters Patent is hereby corrected as shown below:

In the Specification

In Column 8, Line 50, delete "and or" and insert -- and/or --, therefor.

In Column 19, Line 47, delete "anther" and insert -- another --, therefor.

In Column 22, Line 43, delete "PTSN," and insert -- PSTN, --, therefor.

In the Claims

In Column 23, Line 1, in Claim 1, delete "one or more one or more" and insert -- one or more --, therefor.

Signed and Sealed this  
Thirty-first Day of December, 2019

Andrei Iancu  
*Director of the United States Patent and Trademark Office*